United States Patent
Yoon et al.

(10) Patent No.: US 8,014,378 B1
(45) Date of Patent: Sep. 6, 2011

(54) METHOD AND APPARATUS FOR AUTOMATIC CONTROL OF TIME-OF-DAY SYNCHRONIZATION AND MERGING OF NETWORKS

(75) Inventors: Chang-June C. J. Yoon, Edison, NJ (US); Patrick R. Walsh, Flanders, NJ (US)

(73) Assignee: ITT Manufacturing Enterprise, Inc., Wilmington, DE (US)

( * ) Notice: Subject to any disclaimer, the term of this patent is extended or adjusted under 35 U.S.C. 154(b) by 2306 days.

(21) Appl. No.: 10/690,552

(22) Filed: Oct. 23, 2003

(51) Int. Cl.
*H04J 3/06* (2006.01)
*H04B 7/212* (2006.01)
*H04W 4/00* (2009.01)

(52) U.S. Cl. .......................... 370/350; 370/324; 370/338

(58) Field of Classification Search .................. 370/350, 370/238, 338, 340, 410, 234
See application file for complete search history.

(56) References Cited

U.S. PATENT DOCUMENTS

| | | | |
|---|---|---|---|
| 4,144,414 A | 3/1979 | Nicholas | |
| 5,146,585 A | 9/1992 | Smith, III | |
| 5,245,634 A | 9/1993 | Averbuch | |
| 5,258,964 A | 11/1993 | Koma et al. | |
| 5,313,465 A | 5/1994 | Perlman et al. | |
| 5,327,468 A | 7/1994 | Edblad et al. | |
| 5,416,808 A | 5/1995 | Witsaman et al. | |
| 5,504,878 A | 4/1996 | Coscarella et al. | |
| 5,510,797 A | 4/1996 | Abraham et al. | |
| 5,579,513 A | 11/1996 | Strohmer | |
| 5,590,092 A | 12/1996 | Fehnel | |
| 5,818,885 A | 10/1998 | Kim | |
| 6,104,729 A | 8/2000 | Hellum et al. | |
| 6,115,825 A | 9/2000 | Laforge et al. | |
| 6,157,957 A | 12/2000 | Berthaud | |
| 6,433,734 B1 | 8/2002 | Krasner | |
| 6,452,541 B1 | 9/2002 | Zhao et al. | |

(Continued)

FOREIGN PATENT DOCUMENTS

EP 0 653 845 B1 6/2000

(Continued)

OTHER PUBLICATIONS

Ohta et al., An Adaptive Multihop Clustering Scheme for Highly Mobile Ad Hoc Networks, Apr. 2003, Appear in Antonomous Decentralization Systems, 2003. ISADS 2003, The Sixth International Symposium on, pp. 293-300.*

(Continued)

*Primary Examiner* — Jinsong Hu
*Assistant Examiner* — Opiribo Georgewill
(74) *Attorney, Agent, or Firm* — Edell, Shapiro & Finnan, LLC

(57) ABSTRACT

A method and apparatus for synchronizing time of day (TOD) information between radio nodes of a network and for detecting and merging otherwise isolated radio networks. In this manner individual isolated networks are able start when they are ready and once connectivity is detected with another network, the two networks can merge. Radio nodes within each network periodically send out TOD messages and periodically receive TOD messages issued by other nodes look to identify networks within communication range. Upon detecting another network a radio node informs a central control node that uses network detection information received from its members to determine the extent of the connectivity between the two networks and whether to merge the two networks. Network searching is optimized to limit impact on the overall network performance, resulting in little or no degradation in network performance.

38 Claims, 9 Drawing Sheets

U.S. PATENT DOCUMENTS

| | | | |
|---|---|---|---|
| 6,501,808 | B1 | 12/2002 | Zscheile, Jr. |
| 6,532,274 | B1 | 3/2003 | Ruffini |
| 6,535,926 | B1 | 3/2003 | Esker |
| 2001/0029166 | A1* | 10/2001 | Rune et al. ............... 455/41 |
| 2002/0059434 | A1* | 5/2002 | Karaoguz et al. ......... 709/228 |
| 2003/0048782 | A1 | 3/2003 | Rogers et al. |
| 2004/0033778 | A1* | 2/2004 | Fonseca et al. ........... 455/11.1 |
| 2004/0047307 | A1* | 3/2004 | Yoon et al. ............... 370/324 |
| 2005/0243765 | A1* | 11/2005 | Schrader et al. .......... 370/328 |

FOREIGN PATENT DOCUMENTS

EP  1 049 270 A2  11/2000

OTHER PUBLICATIONS

Specification of the Bluetooth System, Wireless connections made easy; Version 1.0B, Dec. 1, 1999; 1082 pages.

Part 11: Wireless LAN Medium Access Control (MAC) and Physical Layer (PHY) Specifications; ANSI/IEEE Std 802.11, 1999 Edition; 582 pages.

System Architecture Specification for the SUO SAS Networking Subsystem; Version 1, ITT A/CD, Jun. 8, 2000; 38 pages.

Digital Message Transfer Device Subsystems; Department of Defense Interface Standard; MIL-STD-188-220C; May 22, 2002; 496 pages.

Roland Mandler; A Configurable Adjunct for Real Time Systems (CARTS); IEEE 1995; pp. 48-49.

Danny Dolev, et al.; "Dynamic Fault-Tolerant Clock Synchronization"; Journal of the Association for Computing Machinery, vol. 42, No. 1, Jan. 1995, pp. 143-185.

Noshir R. Dhondy, et al.; "Coordination of time-of-day clocks among multiple systems"; IBM J. Res. Develop, vol. 36, No. 4, Jul. 1992; pp. 655-665.

W.D. Grover, et al.; "Precision Time-Transfer in Transport Networks Using Digital Cross-Connect Systems"; IEEE Transactions on Communications, vol. 38, No. 9, Sep. 1990; pp. 1325-1332.

C.J. Yoon, et al.; "Apparatus and Method of Flywheel Time-Of-Day (TOD) Synchronization"; pending U.S. Appl. No. 10/238,145, filed Sep. 9, 2002.

* cited by examiner

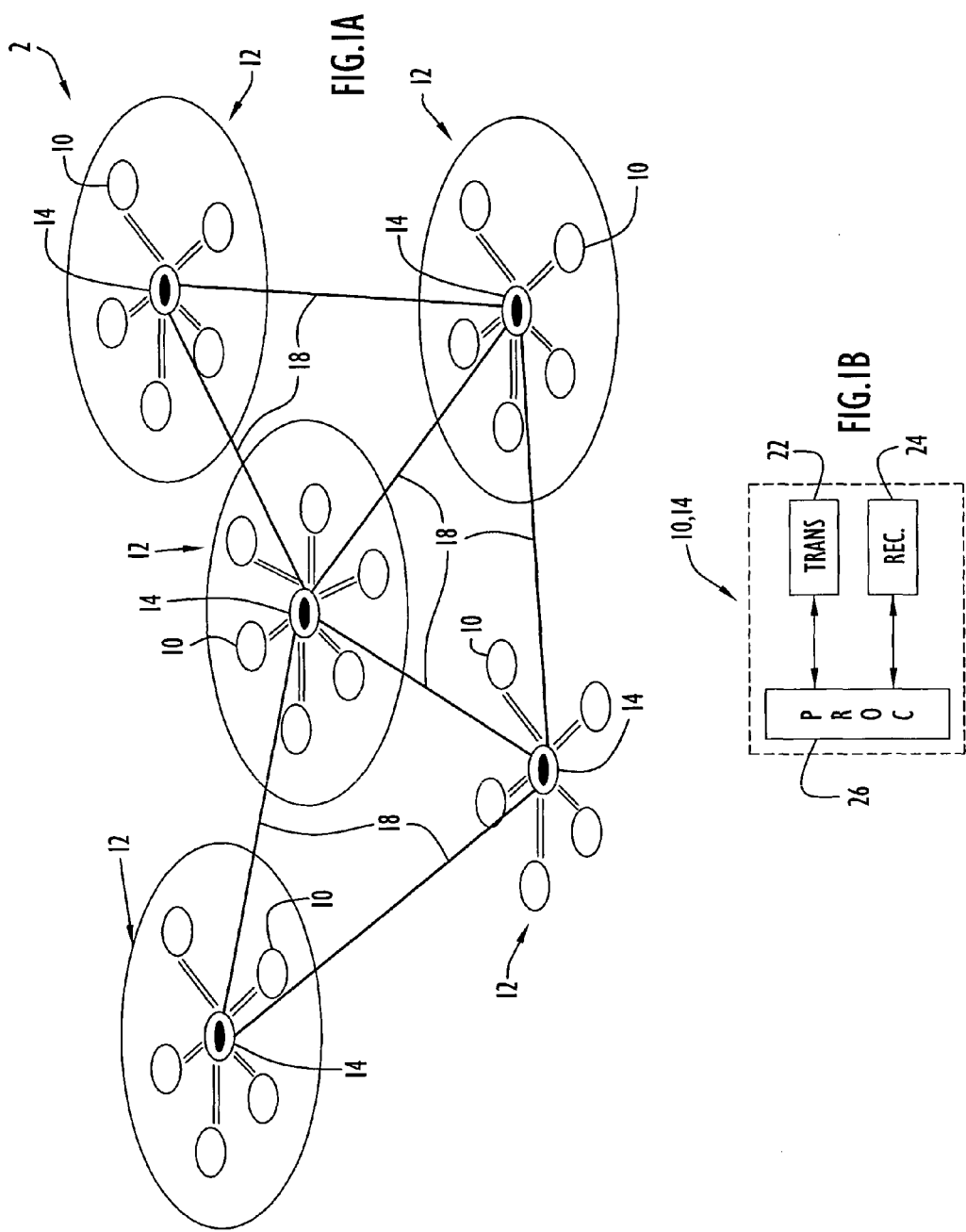

METHOD AND APPARATUS FOR AUTOMATIC CONTROL OF TIME-OF-DAY SYNCHRONIZATION AND MERGING OF NETWORKS

BACKGROUND OF THE INVENTION

1. Field of the Invention

The present invention pertains to wireless communication networks. In particular, the present invention pertains to a wireless communication network with automatic control of time-of-day synchronization and merger with other networks.

2. Description of the Related Art

Due to the severe timing constraints imposed by tactical wireless ad-hoc networks, communication units or radios within that type of network must establish a common network time before they can start to communicate. This is accomplished by Time-Of-Day (TOD) synchronization. Conventional tactical radio systems, such as the NTDR (Near Term Data Radio) system, built by ITT, can operate with two different TOD algorithms. Selection of a TOD algorithm is based on a parameter in a pre-defined radio configuration. The primary TOD mode is global positioning system (GPS) based TOD, in which network TOD is slaved to GPS time. A secondary TOD mode, that is used when GPS is not available, is Brigade Time Head (BTH) based TOD.

In BTH based TOD synchronization, the network TOD is started by a single master (Brigade Time Head) radio. Time is then averaged across all participants in the network. If a radio network is started in BTH mode, the network remains operating solely in BTH mode. While operating within a BTH network, GPS configured radios ignore GPS signals. In the conventional NTDR TOD approach, no solution exists for converting a BTH network to a GPS based network once the respective TOD references differ by more than one epoch.

In GPS based TOD synchronization, at least one radio is deployed with local GPS and the network operates solely as a GPS based network (as long as GPS is available). If GPS signals are lost, the network converts to a BTH mode of operation. Once radios connect as a GPS based TOD network, the radios only exchange current net time with other radio nodes. The respective radios in the network stop looking for alternate sources of timing.

Furthermore, in a BTH based network, a radio can become operational only if it is in range of the network started by the BTH master. This means that radio nodes that are out of range of the network remain off-line until connectivity is provided back to the main network. The existing NTDR TOD protocol does not allow different time based networks to merge, even if they are geographically close and are within radio frequency (RF) range.

Recently introduced commercial wireless devices employ clock synchronization techniques for the operation of WPAN (Wireless Personal Area Networks) and WLAN (Wireless Local Area) Networks. For example, Bluetooth devices are WPAN type devices designed to support low bandwidth, short distance (<10 m) wireless connections. Bluetooth specifies the protocols to be used by different handheld computing devices in order to communicate and exchange data. For timing purposes, Bluetooth specifies a master/slave clock synchronization mechanism that allows synchronization between neighbors within one-hop from each other.

The IEEE 802.11 WLAN standard specifies two different approaches for time synchronization: (1) one approach for infrastructure-based networks and (2) one approach for independent networks. For infrastructure-based networks, IEEE 802.11 provides a master/slave clock synchronization mechanism. A special fixed node, the access point (AP), is used as a master, and all other nodes slave to this master. In an independent network, a mobile node transmits a beacon message, repeating on a beacon period. Each receiving node updates its clock with the value in the received beacon message if the received value is greater than its current local time. If the received value is less than the local time, the received value is discarded. Neither WPAN nor WLAN networks support merging of different TOD networks.

Tactical radios within the NTDR system, employ one receiver and one transmitter (1R/1T). Each radio tunes to a reservation channel whenever the radio is not involved in a message transaction. Since NTDR nodes can not monitor the reservation channel during a message transaction, timing messages can be lost. In new tactical radios, such as ITT's small unit operations (SUO) radio, this problem is corrected by adding an auxiliary receiver, thereby providing two receivers in the radio (2R/1T). When the transceiver of a SUO radio is used for a message transaction, the auxiliary receiver switches to monitor the reservation channel. In this manner, the reservation channel is monitored continuously. The extra receiver employed in the SUO system requires additional hardware/software, a capability not available in NTDR.

NTDR transmission security (TRANSEC) can operate from two different TOD sources. Selection of a TOD source is determined by a configurable parameter within the radio configuration. As previously described, normal TOD mode is GPS based TOD. BTH based TOD is optional and/or provides a fall back capability should GPS based TOD fail.

In GPS based TOD mode, network TOD is slaved to GPS time. A network member may receive GPS directly or receive a TOD message update from another radio (or node). Radios not receiving GPS signals are slaved to radios receiving GPS signals. To start a network, at least one of the radios in the network must receive a GPS signal. If the GPS signal is lost across the whole network for a predetermined period of time, the network members switch to a BTH based TOD mode. If a radio again begins to receive a GPS signal after the network has switched to BTH mode, the GPS signal is ignored and the radio remains operating in the BTH mode.

In BTH based TOD, the network TOD is generated from the average TOD received from all radios during a periodic, pre-defined interval. One radio in the network is pre-designated to be the Brigade Time Head Master by the radio configuration. This is the only radio that can bring up a network. Once the network is up, new members join the network by getting TOD through Cold Start (CS) and Late Net Entry (LNE) messages. Since the BTH master station is only used to start the network, if the master station disappears after the network is started, the BTH network is not adversely affected. Splintered networks can rejoin only if their respective network TODs remain within 80% of a common TOD epoch.

In conventional TOD protocols, only nodes without a selected timing source search for CS and LNE messages. Once these messages are received, the node proceeds to make a timing source selection from the information in these messages. When a node is an operational member of a network, or In-Net (i.e., is able to send data messages via a network data channel to other member radio nodes of a network), the node may periodically transmit CS and LNE messages to bring in other nodes that are unaffiliated. Nodes that are operating in the In-Net state may not listen for other CS or LNE messages. Therefore, these nodes are typically unaware that other network(s) may exist operating with a time offset from their network.

The TOD synchronization scheme of the NTDR system has been modified to meet small unit operations (SUO)

requirements for radio operation in extremely mobile, volatile environments under power and bandwidth limited conditions. The basic functionality of CS, LNE and In-Net modes of the NTDR system are similar to Isolated, In-Sync, and Associated modes employed in the SUO system (2R/1T and 2R/2T). The SUO TOD system, however, includes a "flywheel" synchronization scheme by which a roaming radio node with local GPS can synchronize with the existing (non-GPS based) net time, immediately, and slowly pull the net time toward the GPS based time.

An exemplary NTDR wireless network is illustrated in FIG. 1A. Specifically, wireless network 2 includes a plurality of nodes 10 arranged in cells or clusters 12 in accordance with predetermined clustering rules. Each cell or cluster includes corresponding cluster member (CM) nodes 10 with one of those cluster member nodes designated as a cluster head (CH) node 14. These cluster arrangements form a first tier of network 2. Communication within a cluster is facilitated by the cluster head which maintains information related to the cluster. For example, in the case of a small isolated network with a single cluster head, the cluster head may maintain an information store that contains information specific to its respective cluster (i.e., its isolated network), such as the total number of nodes in the network, the number of active nodes in the network, traffic loads through portions of the network (i.e., between identified cluster members), etc.

In accordance with predetermined clustering rules, cluster heads typically establish communication with each other, preferably utilizing a second transmission frequency, and form a backbone network 18. The backbone network essentially forms a second tier of network 2 and facilitates communications between nodes of different clusters (e.g., generally providing communications over greater distances). The architecture of network 2 is similar to that of conventional cellular telephone systems, except that network 2 provides dynamic selection of cells and cluster head nodes.

A typical network node 10 is illustrated in FIG. 1B. Specifically, node 10 includes a transmitter 22, a receiver 24 and a processor 26. The processor is preferably implemented by a conventional microprocessor or controller and controls the node to transmit and receive messages in accordance with communication protocols. The transmitter is preferably implemented by a conventional transmitter and transmits messages from the processor, preferably in the form of radio frequency (RF) signals, in accordance with processor instructions. Receiver 24 is typically implemented by a conventional receiver and configured to receive signals, preferably in the form of radio frequency (RF) signals, transmitted by the transmitter of another node. The receiver receives transmitted signals and forwards the received signals to processor 26 for processing. The node further includes an identifier (e.g., a code or identification number) to identify the particular node and a database (not shown) to store information pertaining to neighboring nodes. Cluster head (CH) nodes 14 are substantially similar to node 10 described above.

Prior to establishment of the network described above with respect to FIG. 1A, individual nodes are started (i.e., powered up) and the network is initiated based upon predetermined rules defined within each respective node. FIGS. 2A and 2B present conventional NTDR node startup process flows by which an individual node powers up and initiates a new network or joins an existing network. Startup of an NTDR node configured to join a network using GPS based TOD synchronization is presented in FIG. 2A. Startup of an NTDR node configured to join a network using BTH based TOD synchronization is presented in FIG. 2B.

Referring to FIG. 2A, upon start of a radio node configured to join a GPS TOD based network, at step 102, the radio node enters a cold start (CS) mode, at step 104, sets node status to Isolated (i.e., sets an isolated flag to "ON"), at step 106, and waits for receipt of a cold start (CS) packet, at step 108. Cold start (CS) messages allow Isolated nodes to join the network. Isolated nodes can be offset in TOD by large deltas from the In-Net TOD.

When an Isolated node receives any CS message, as determined at step 110, the local clock is updated with the neighbor's TOD, at step 112, and the node sets its status to In-Sync, at step 114. It is important to note that a status of In-Sync merely indicates that the isolated radio node has successfully synchronized its local clock to the TOD contained within a CS message received from a neighbor node. The isolated node remains isolated (i.e., is unable to send data messages via a network data channel to another radio node) until the isolated node achieves in network, or In-Net, status as described below.

The Isolated node waits to receive additional LNE messages to further correct its time, at step 116, before it changes the status of the radio node to In-Net, at step 118. If no further LNE messages are received, at step 116, within a predetermined period of time, the node returns to cold start mode and processing resumes at step 104, as described above.

If, at step 110, no CS message is received, yet the node determines that it has access to a local GPS signal, at step 120, the node declares its status as In-Net, at step 122, and starts to send CS, LNE and TOD messages, at step 124, until a predetermined period of time (e.g., WaitInNetTimer) expires, at step 126. The CS, LNE and TOD messages sent out by the node at step 124, are sent out at an accelerated rate (i.e., based upon an interval timer TODinterval of short duration), so that many nodes can join the network during the initial TOD operation.

Regardless of the startup path taken by the node to achieve In-Net status, as described above, once the startup process is complete, the node proceeds to periodically send/receive, at step 128, CS, LNE and In-Net TOD messages in order to distribute TOD information to neighboring nodes, establish contact with unaffiliated nodes, and to receive TOD updates from neighboring nodes. If upon receiving a message the receiving radio node determines that GPS TOD time is available, at step 130, the receiving node ignores, at step 132, the TOD update. If, upon receiving a message, the receiving radio node determines that GPS TOD time is not available, the receiving node accepts, at step 134, the TOD update. Next, at step 136, the receiving node processes the TOD update to determine whether to use the TOD contained therein. In one embodiment, a receiving node is configured to update its TOD to the TOD of a neighboring node with the fewest number of links to the GPS signal TOD source. In case of a tie with respect to number of hops, the receiving node is configured to choose the TOD of the neighboring node with the fewest number of links to the GPS signal and the lowest node identifier. The node continues to send and receive CS, LNE and In-Net TOD messages in such a manner so long as contact with neighboring nodes is maintained. Upon determining, at step 138, that no messages have been received in a predetermined amount of time, the node returns to cold start (CS) state, and processing continues at step 104.

Startup of an NTDR node configured to join a network using BTH based TOD synchronization is presented in FIG. 2B. As shown in FIG. 2B, upon start of an NTDR radio node configured to join a BTH based network, at step 202, the radio node sets node status to Isolated (i.e., sets an Isolated flag to "ON"), at step 204, and waits, at step 206, to receive an LNE message.

Upon receipt, at step 206, of an LNE message, the radio node sets, at step 208, its real time clock (RTC) to the received TOD, sets, at step 210, node status to In-Sync (i.e., sets an In-Sync flag to "ON") and sets, at step 212, an In-Sync wait timer. If the radio node receives, at step 214, an In-Sync message from another network node before expiration, at step 216, of the In-Sync timer, the radio node sets, at step 218, node status to In-Net (i.e., sets an In-Net flag to "ON") and proceeds, at step 220, with execution of In-Net TOD processing as described below with respect to FIG. 3.

If no LNE message is received, at step 206, and the radio node determines, at step 222, that the radio node is a BTH master clock node, the radio node sends, at step 224, a series of brigade (BDE) beacon messages (e.g., one beacon message per BeaconInterval of 1 second for a predetermined period of time) to inform other radios that it is the master radio. The other non-BTH-master radios remain silent until they receive a BDE beacon message. Upon receiving a BDE beacon message, each radio sends out a BDE beacon acknowledgement (ACK) message indicating that it is listening. The BTH master node receives, at step 226, the beacon ACK messages and sets, at step 228, a timer of duration WaitBeaconAckTime (e.g., 4 minutes) to allow time, at step 230, for other radios to turn on. Upon expiration, at step 230, of the WaitBeaconAck-Time timer, the master radio, at step 232, sets status to In-Sync (i.e., sets an In-Sync flag to "ON") and sends out, at step 234, multiple LNE and In-Sync messages. For example, in one embodiment, the BTH master sends one LNE message and one In-Sync TOD message every InSyncXmtInterval (e.g., 0.5 seconds) for a duration of InSyncXmtDuration (e.g., sixteen seconds). After expiration, at step 236, of the InSyncXmtDuration interval, the master radio switches, at step 218, its node status to In-Net (i.e., sets an In-Net flag to "ON") and proceeds, at step 220, with execution of In-Net TOD processing as described below with respect to FIG. 3. Until a radio is in In-Net operation, no data traffic is passed on a network except TOD update messages. It is important to note that LNE messages are transmitted upon the reservation channel and In-Sync TOD messages are transmitted over the data communication channel. In this manner, while in In-Sync mode, a radio node continues to receive TOD updates, even when the reservation channel is not being monitored.

FIG. 3 presents an example of TOD maintenance and In-Net status processing with respect to an NTDR node within a BTH network, initiated as described with respect to FIG. 2B. As shown in FIG. 3, upon a radio node achieving In-Net status, at step 302, the node broadcasts, at step 304, LNE TOD messages at a rate determined by the cluster head or cluster member status of the node. For example, the delay between broadcasts is typically a fixed delay supplemented with a random delay. In a cluster head node, the fixed delay is typically two minutes and the random delay is between 0 and 2 minutes. In a cluster member node, the fixed delay is typically eight minutes and the random delay is between 0 and 2 minutes.

Upon sending, at step 304, LNE TOD messages, as described above, the node sets, at step 306 an AverageNetTime (e.g., 2 minutes) timer and proceeds to compute, at step 308 the average delta time associated with TODs received from neighboring nodes prior to expiration, at step 310, of the AverageNetTime timer. The average delta time is a mathematical average of the TOD values received in LNE TOD messages received during the AverageNetTime period (e.g., 1 second). Use of an average delta time calculated from TOD information received from neighboring nodes during a fixed time interval, in such a manner, prevents a sudden change in network time. Upon expiration of the AverageNetTime timer, at step 310, the radio node updates, at step 312, its TOD with the computed average delta time, calculated in step 308, and proceeds to conduct normal communications, at step 314, using the updated TOD. If the radio node receives any messages from neighboring nodes prior to expiration, at step 316, of a CheckInNetThresold (e.g., twenty minutes) timer, the node remains in In-Net mode and TOD processing continues at step 302, otherwise, if the node fails to receive any messages from neighboring nodes prior to expiration, at step 316, of a CheckInNetThresold timer, the node's status changes, at step 318, to Isolated and the radio node again tries to join the existing net in accordance with the process described above with respect to FIG. 2B.

During operational use of NTDR radios, a number of drawbacks have been encountered that are due, to a large extent, upon the conventional NTDR TOD algorithms described above, with respect to FIGS. 1A-3. For example:

- Radios deployed and configured for GPS based TOD require at least one radio to acquire GPS to start the network. Failure of at least one radio to acquire GPS prevents the deployed network from forming.
- Radios deployed and configured for BTH based TOD, require the master radio to start the network. Failure of the master radio to turn-on or to be available to the current network prevents the deployed network from forming.
- Radios not in direct contact with the BTH master radio or a radio with GPS access may fail to startup, thereby leaving off a large section of the network.
- When a BTH network fragments for longer than a maximum network separation time, the network may permanently fragment and have no way to re-merge.
- There exists no merge mechanism in the existing approaches to combine a BTH based network with other BTH network(s) or GPS based network(s).
- There exists no mechanism in the existing approaches to move a network operating in BTH based TOD network to a GPS based TOD network.
- LNE epoch periods are quantized to six-minute increments because the TOD stamped at the link layer header is not the actual TOD time when the over-the-air message is sent. This large LNE epoch period causes slower TOD synchronization.

Hence, a need remains for a method and apparatus for synchronizing TOD and for merging isolated devices/separate networks within a wireless communication environment. Preferably, such an approach would allow individual radios to start up and establish a communication network with surrounding radio devices without connectivity or access to an existing network node, a master radio and/or a GPS signal. Further, such an approach would allow isolated devices and/or separate networks to merge regardless of whether the respective devices and/or networks are operating in GPS or BTH TOD types of synchronization modes.

OBJECTS AND SUMMARY OF THE INVENTION

Therefore, in light of the above, and for other reasons that may become apparent when the invention is fully described, an object of the present invention is to synchronize TOD across radio nodes/networks in a wireless communication environment regardless of whether the respective isolated radio nodes and/or networks are currently operating in GPS or BTH based TOD synchronization mode.

Another object of the present invention is to enable the merging of isolated devices and separate and/or fragmented networks within a wireless communication environment regardless of whether the respective isolated devices and/or networks are currently operating in GPS or BTH based TOD synchronization mode.

Yet another object of the present invention is to allow an individual radio node to start up and establish a communication network with surrounding radio nodes without connectivity to a master radio, an existing network, or a GPS signal.

Still another object of the present invention is to allow fragmented networks and isolated radios that have lost contact with an established network to establish a separate communication network that can be merged with the original network, other network fragments and/or other individual radios once radio contact is reestablished.

A further object of the present invention is to reduce the impact of network searching, network merging and TOD synchronization upon overall network performance.

The aforesaid objects are achieved individually and in combination, and it is not intended that the present invention be construed as requiring two or more of the objects to be combined unless expressly required by the claims attached hereto.

In accordance with the present invention, improved methods and apparatus for establishing and managing radio networks are described. A new TOD synchronization protocol is described that allows automatic detection and re-synchronization between GPS based and BTH based TOD networks. One embodiment of the present invention allows for plural BTH masters. These additional masters allow isolated radio nodes to operate one or more smaller networks until connectivity with another network is detected. Once connectivity is detected, the two networks are allowed to merge. The ability to flexibly form isolated networks, and to flexibly merge isolated networks as connectivity is detected with other networks, provides a wireless ad-hoc networking capability much more robust and efficient under mobile and volatile communication conditions.

The present invention allows a radio node to check for conditions in the node's geographic location and to decide the manner in which a network should be started. For example, a radio node may check for an existing network, then GPS or master BTH status. If none of these conditions exist, the node may proceed to start the network. Such isolated network startup capability is not allowed in conventional protocols, because such conventional protocols do not allow separate networks to merge, and without a merge capability such isolated networks would become permanently segregated from other nodes in the network. However, with merge capabilities performed in accordance with the present invention, individual isolated networks can start when they are ready and, once connectivity is detected with another network, the two networks can merge.

The present invention allows nodes to periodically look for other networks, and thereby discover each other. Once the networks discover each other, a central control node makes decisions regarding how the two networks are to merge. In one representative, non-limiting embodiment, each network sends out TOD messages to collect unaffiliated nodes. Radio nodes in each network periodically look at received TOD messages to identify networks within communication range. Upon detecting another network, a node may inform the central control node (or island head node) that a network has been found. The island head node uses network detection information received from its member nodes to determine the extent of the connectivity between the two networks and to decide whether a merge should be executed.

In one embodiment, the search for other networks is optimized to limit impact on overall network performance. Network occupancy is used as a controlling factor in the search algorithm. The larger the percentage of the network in a segment/fragment, the lesser the amount of time allocated to searching for other networks. Smaller networks are responsible for searching for larger networks. As a result, the larger networks have little or no degradation in performance.

In another embodiment, the capabilities described here are enabled through an exchange of inter-node status information. This new TOD status information, such as network id, number of active members, merge in progress information is used to control/facilitate the merge process. For example, based upon such inter-node status information decisions are made to determine the most effective merge sequence among plural networks.

The above and still further objects, features and advantages of the present invention will become apparent upon consideration of the following detailed description of specific embodiments thereof, particularly when taken in conjunction with the accompanying drawings wherein like reference numerals in the various figures are utilized to designate like components.

BRIEF DESCRIPTION OF THE DRAWINGS

FIG. 1A is a diagrammatic illustration of network nodes arranged in an exemplary NTDR communication network.

FIG. 1B is a block diagram of a network node of FIG. 1A.

DETAILED DESCRIPTION OF THE PREFERRED EMBODIMENTS

Figure 2A:
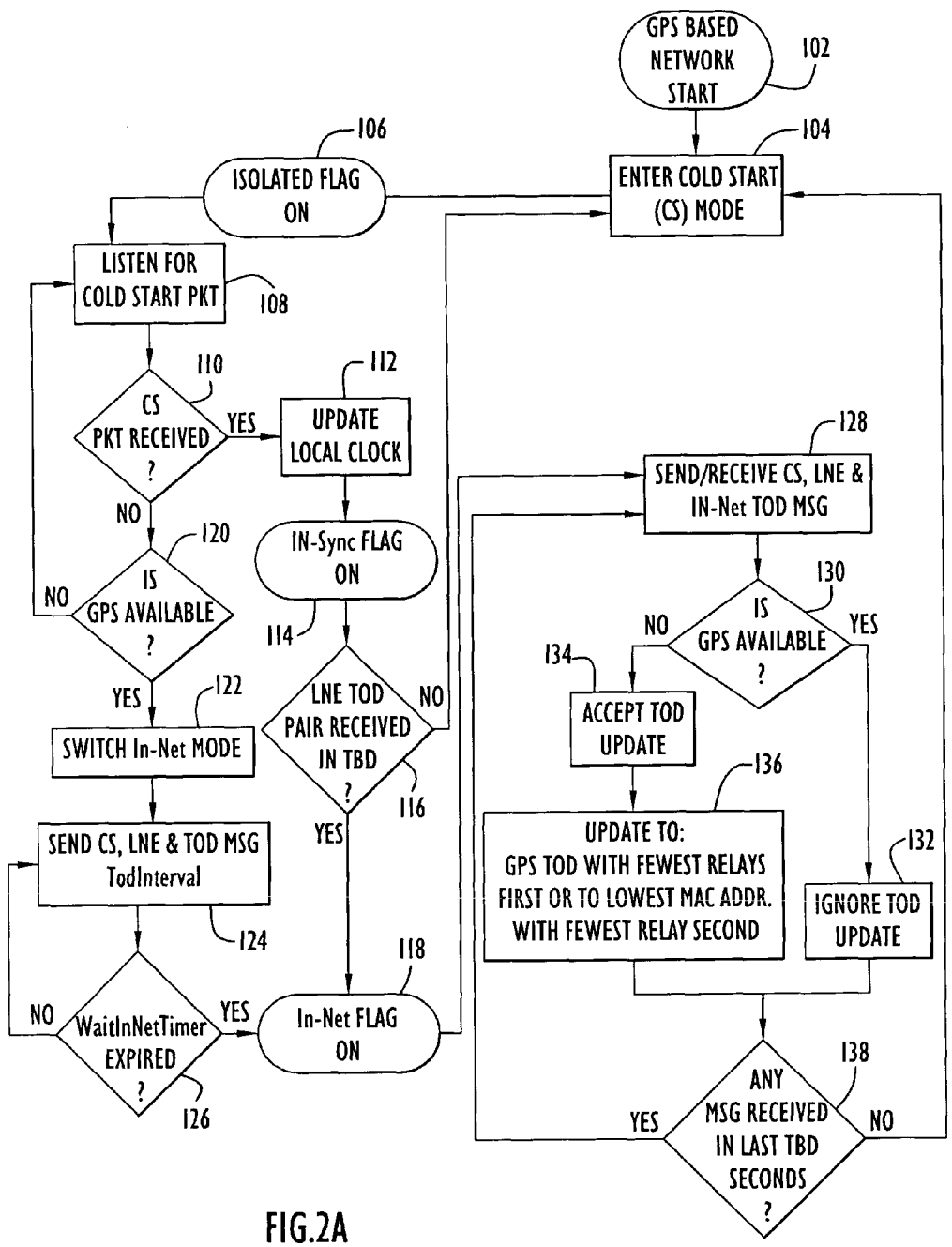
FIG. 2A is a process flow diagram depicting startup of an NTDR node configured to join a network using GPS based TOD synchronization.

The present invention relates to a wireless communication network employing TOD synchronization that supports automatic detection and re-synchronization between GPS based and BTH based TOD networks. If, upon startup, a node is unable to establish connectivity to a network using a pre-configured initial TOD mode (e.g., GPS based TOD mode)

the present invention allows the node to switch to an alternate TOD mode (e.g., BTH TOD mode) and to attempt to establish connectivity to a network using the alternate TOD mode. If a node fails to establish connectivity with a BTH master, the node is able to select a new BTH master from among local nodes that it has detected and to start an isolated BTH network. Such support for plural BTH masters allows isolated groups of radio nodes to operate as small networks until connectivity with other networks is detected. Once connectivity with other networks is detected, the present invention allows the separate, isolated networks to merge.

Using conventional TOD processing approaches (e.g., as described above with respect to FIG. 1A through FIG. 3), a radio node that tries to go operational based upon a TOD mode programmed in its configuration may fail due to a lack of appropriate connectivity required by its assigned TOD mode. In accordance with the present invention, operational conditions are analyzed and new decision processes are added to allow isolated nodes to come into operation as a separate network with other local nodes. Conventional TOD approaches do not allow the creation of such isolated networks because such isolated networks would be permanently isolated from the rest of the network.

For example, in one non-limiting, representative embodiment, a plurality of local radio nodes, upon determining that they collectively lack access to a GPS signal and lack access to an existing BTH network (or BTH master), will select from amongst themselves a BTH master and start an isolated network in BTH mode. Selection of a BTH master is typically performed after a network search delay. The network search delay is used to locate an operational BTH network, if such a network is available. The ability to initiate BTH masters in such a manner (i.e., support for plural BTH masters) allows nodes to start up in diverse geographic or isolated areas without waiting for the network to be completely connected.

In one non-limiting, representative embodiment the new BTH master is selected based upon connectivity between the nodes. In one such exemplary embodiment, a node with the greatest number of one-hop neighbors is selected as the new BTH master. In another such embodiment, an arbitrary approach to selection of a new BTH master is used. For example, a radio node from within the local group of isolated radio nodes that has the highest, or lowest, node identifier can be selected as the new BTH master. It does not matter which node becomes BTH master because the network time will be the average time among network members after synchronization.

As described above, when operating in BTH based network mode, situations arise in which geographically isolated groups need to establish communication services before the entire network is fully deployed. In such situations, isolated groups typically start up in their respective geographic areas and operate independently until the rest of the network deploys. Unfortunately, using the current, conventional BTH protocol, isolated networks operating in BTH based network mode, with TODs that differ by more than one epoch, are not able to merge with other BTH or GPS based TOD networks that are within radio range. As described above, the present invention allows radio nodes within isolated GPS and/or BTH networks to efficiently and effectively detect other networks. Further, the present invention provides a framework by which isolated networks can be efficiently and effectively be merged.

In accordance with the present invention, a cluster head node 14 (as described above with respect to FIG. 1a) maintains an information store that contains information specific to its respective cluster (i.e., its isolated network). The cluster head maintains information such as the total number of nodes in the network, the number of active nodes in the network, traffic loads through portions of the network (i.e., between identified cluster members), etc. Based upon this information, the cluster head computes parameters used by the member nodes to control, for example, how often the respective nodes broadcast CS/LNE messages upon the reservation channel, described above, how long each node is to monitor the reservation channel for CS/LNE messages (i.e., a CS/LNE scan window), and the delay between CS/LNE scan windows. In this manner, a cluster head in a small isolated network plays an important role in assuring that the network merge process is supported, without degrading cluster data communication performance.

Each cluster head also maintains information about external networks that have been detected by the respective member nodes within the cluster via CS/LNE messages received via the reservation channel, as described above. Based upon stored information about a detected network, a cluster head determines whether the two networks are to merge, and initiates the merge process, if appropriate. In support of merging decisions, cluster heads of the respective isolated clusters/networks exchange network size and merge priority information that is used by the respective cluster heads to determine which, if any, cluster head is to initiate (i.e., control) the merge process.

Upon merging, one of the cluster heads 14, typically the cluster head associated with the larger of the two merging clusters/networks, continues to control merge decisions for the combined network and is referred to as the island head (IH) node. The respective cluster heads within a network created from the merging of two or more networks continue to perform cluster head functions, such as maintaining node related data and traffic information, as described above, however, the island head node assumes primary responsibility for controlling future merges.

For example, upon receiving notification from a member node or cluster head node that a new network has been detected, the IH determines merge priorities for all detected networks (including the newly detected network). These IH merge priorities are broadcast in future CS/LNE messages issued by the IH node and are echoed in future CS/LNE messages broadcast by nodes within the network controlled by the IH node. Such merge priorities are typically based upon the size of the detected network, as described below.

The merge function of the present invention allows radio nodes, which would otherwise be non-operational, to go operational within small isolated networks. Nodes configured to join a common network are assigned a common network identifier and, upon initiation of an isolated network, each node in the isolated network is assigned a partition identifier that is unique to the newly started network. In this manner, two isolated networks, upon detecting each other, are able to ascertain whether the respective networks are candidates for merging. For example, prior to merging, two networks would need to determine that they share a common network identifier yet have different partition identifiers, indicating that the two networks are, in fact, isolated network components of the larger defined network. After merging, the nodes would retain the same network identifier and a common partition identifier, typically the partition identifier of the larger of the two merging networks.

The merge function of the present invention allows isolated networks to eventually merge with other established networks once the nodes of the respective network come into contact with one another. Further, the present invention includes capabilities for optimizing merge related functions based upon monitored network parameters to assure that execution of merge related functions do not adversely affect ongoing communication between operational nodes, whether such nodes are operating in a GPS or a BTH based TOD mode.

A radio node with a single receiver and a single transmitter (1R/1T) must alternate the node's operation frequently from receiving/transmitting normal communication traffic to transmitting/scanning for CS/LNE messages from neighboring networks via the reservation channel. The time that the receiver is opened to scanning for CS/LNE messages from other networks (i.e., the CS/LNE scan window) is time that the receiver cannot be used for receiving data communication via the data channel. Further, time spent broadcasting CS/LNE messages in support of network merging, is time that the transmitter cannot be used for transmitting data communication. Therefore, the time that a radio node's CS/LNE scan window is open for searching for CS/LNE messages from other network, is adjusted based upon a trade-off between efficiency in data communication and efficiency in network merging.

In accordance with the present invention, each network has a radio node that is designated an island head (IH) node. The island head node maintains an information store that contains information specific to its respective network, such as the total number of nodes in the network, the number of active nodes in the network, traffic loads through portions of the network, etc. Further, each island head node maintains information about the networks that have been detected, such as each detected network's unique identifier, the number of nodes in each detected network, the number of active nodes in the detected network, traffic load in each detected network, etc.

As network nodes detect messages from external networks, the detecting nodes inform the island head node for their respective network. In this manner, the island head node has sufficient information upon which to determine whether or not to merge, and/or to coordinate a merge, with a detected network. The island head node, in response to network detections, sets/changes control states for the network. These state changes are broadcast to member radio nodes under the control of the respective island head node and control the behavior of the member radio nodes in support of network merge activities.

In accordance with the present invention, each radio node periodically sends out a CS packet in accordance with a settable timer. The timer values change depending on the node's operational status within the network as a cluster member (CM) or cluster head (CH). The message rates are adjusted to help accelerate the merge discovery process. The CS/LNE scan window duration and the CS transmit timing are tuned, as described below, to minimize the scan time versus network bandwidth used in the search. For example, a transmitter's CS/LNE message may include the network ID, TOD information, an island head node identifier, and the size of the transmitting node's network. This information is used by each network to determine net identities and who should merge to whom. Smaller networks are encouraged to merge with larger networks.

An island head node decides whether to merge with an external detected network based upon the characteristics of the external network in comparison to the characteristics of the island head node's own network characteristics. In one non-limiting, representative embodiment, an island head node will call for a merge upon detecting an external network that is larger than the island head node's network and assigned to the same BDE network as the island head node, but assigned to a different network partition than the island head node. To implement the merge, the island head node informs the nodes, via merge related messages, what states they should operate in, what networks to merge with, and the precise time at which to merge. The precise merge start time is set by the island head node to allow for distribution to the entire network and to allow all nodes to merge simultaneously. The BDE network identifier and partition identifier of the network that the nodes are to merge with is distributed via these merge related messages. At the specified start time, the nodes in the merging network change their TOD to the TOD of the new network and change their network associations (e.g., BDE network identifier and partition identifier) to the associations of the new network.

As described above, the present invention uses several techniques to provide an efficient and effective merge capability in a NTDR operational environment. Such techniques include those described below.

First, a node that is unable to establish connectivity to a network using a pre-configured initial TOD mode (e.g., GPS based TOD mode) is able to switch to an alternate TOD mode (e.g., BTH TOD mode) and to attempt to establish connectivity to a network using the alternate TOD mode, and vice versa.

Second, a group of isolated nodes (i.e., nodes that are unable to join an existing network due to lack of GPS access and/or lack of access to a BTH master) are able to select their own BTH master from among the group of isolated nodes and to start an isolated BTH network. Support for plural BTH masters allows isolated groups of radio nodes to operate as small networks until connectivity with other networks is detected.

Third, in support of the merge process, nodes within isolated networks broadcast the existence of their respective networks via CS/LNE messages that contain the conventional TOD data plus new merge information (e.g., a BDE network ID, partition ID, etc.) that is used by unaffiliated nodes or nodes associated with other TOD networks to identify the CS/LNE message as coming from an external network. For example, in one non-limiting, representative embodiment, the following merge TOD information is added to conventional CS/LNE messages: BDE network ID (as described above); partition ID (as described above); network size; designated BDE network ID (i.e., the BDE network ID of a network with which a merge is planned); and designated partition ID (i.e., the partition ID of a network with which a merge is planned). In this manner, information in support of network detection/merge activities is shared between radio nodes without significantly increasing inter-node radio communication overhead.

Fourth, in accordance with the present invention, effectiveness of CS/LNE message transmission is maximized by periodically broadcasting CS/LNE messages upon expiration of a specifically determined CS/LNE transmit delay timer, the duration of which is optimally derived based upon parameters specific to the isolated network transmitting the CS/LNE message. In this manner, transmission of messages in support of network detection/merge activities are supported, while transmission time for node data communication is optimized.

Fifth, in accordance with the present invention, the amount of time that a radio node dedicates to scanning for CS/LNE messages is optimized based upon characteristics of the network with which the radio node is associated. Based upon considerations such as the total number of nodes in the network and the number of active nodes in the network, a specific CS/LNE scan window (i.e., a period during which the node scans for CS/LNE messages) and a CS/LNE scan window delay interval (i.e., a period of time between respective scan windows) are determined. The CS/LNE scan window and CS/LNE scan window delay interval values are determined so that each radio node spends an appropriate amount of time scanning for CS/LNE messages yet sufficient time is allotted for data communication so that network capacity is not adversely affected. In general, radio nodes in smaller networks, with lighter traffic are allotted a greater amount of time for scanning for CS/LNE messages. In this manner, scanning for CS/LNE messages in support of network detection/merge activities is supported, without straining the data communication capacity of heavily loaded larger networks by placing a greater responsibility for CS/LNE message scanning upon smaller networks with lesser data communication loads.

Sixth, once separate networks have detected one or more other networks, the present invention provides a manner for controlling the order in which the respective networks are to merge, and for controlling execution of each merge so that data communication in each of the respective merging networks, and in networks waiting to merge, is not disturbed.

An island head node receives messages from cluster head and cluster member nodes regarding new network detections and cluster traffic loads. In one embodiment, the island head node uses this information to control how often radio nodes transmit CS/LNE/In-Sync TOD messages and how long radio nodes scan for CS/LNE messages from other radio nodes/networks by calculating values for the CS/LNE transmit rate ($\lambda$), the CS/LNE scan window ($\tau$) and the CS/LNE scan window delay interval ($T_{delay}$) and distributing these values to nodes within the network controlled by the island head node. In another embodiment, the island head node distributes network size and traffic density related information (collected/generated from messages received from cluster head and member radio nodes) back to the cluster head and member radio nodes that use the information to generate values for CS/LNE transmit rate ($\lambda$), the CS/LNE scan window ($\tau$) and the CS/LNE scan window delay interval ($T_{delay}$) locally.

Further, the island head node decides which networks should merge, and in what sequence the networks should merge, based upon a defined rule set and an assessment of network related parameters. In one non-limiting, representative embodiment, an island head node chooses to merge its network with another detected network based upon connectivity and size considerations. For example, the island head can be configured to initiate a merge with the larger of the detected networks that are available for merging and configured to place preference on networks with GPS access. However, network merge selection criteria is not limited to such an embodiment and may include other parameters, such as network traffic/network load considerations.

If the island head node decides to execute a merge, the island head node tells all nodes that a merge is in progress and a merge time is distributed. Once a decision to merge is made the merge process continues until the merge operation is complete. The merging network sends a message to the network that it is merging to, so that the network to be merged with remain operational (i.e., ceases other potential network merge activities) until the merge is complete. If an island head node receives a message from another network indicating that a merge is requested, the island head node acknowledges the merge request and disables other merges until the merge is complete.

It is important to note that the capabilities of the present invention can be implemented upon a conventional NTDR one receiver and one transmitter (1R/1T) radio node, a small unit operations (SUO) radio node with two receivers in the radio (2R/1T), a SUO radio node with two receivers and two transmitters and/or any other device that includes, as a minimum, the hardware and processing capabilities of a NTDR 1R/1T radio node 10, as described with respect to FIG. 1B, above. Specifically, as shown in FIG. 1B, a radio node 10 compatible with the present invention typically includes a transmitter 22, a receiver 24 and a processor 26. The processor is preferably implemented by a conventional microprocessor or controller and controls the node to transmit and receive messages in accordance with the present invention. The transmitter is preferably implemented by a conventional transmitter and transmits messages from the processor, preferably in the form of radio frequency (RF) signals, in accordance with processor instructions generated in accordance with the present invention. Receiver 24 is typically implemented by a conventional receiver and configured to receive signals, preferably in the form of radio frequency (RF) signals, transmitted by the transmitter of another node. The receiver receives transmitted signals and forwards the received signals to processor 26 for processing in accordance with the present invention. The node further includes an identifier (e.g., a code or identification number) to identify the particular node and a database (not shown) to store information in accordance with the present invention as described below. Cluster head (CH) nodes and Island Head (IH) nodes are substantially similar to node 10 described above.

Figure 4:
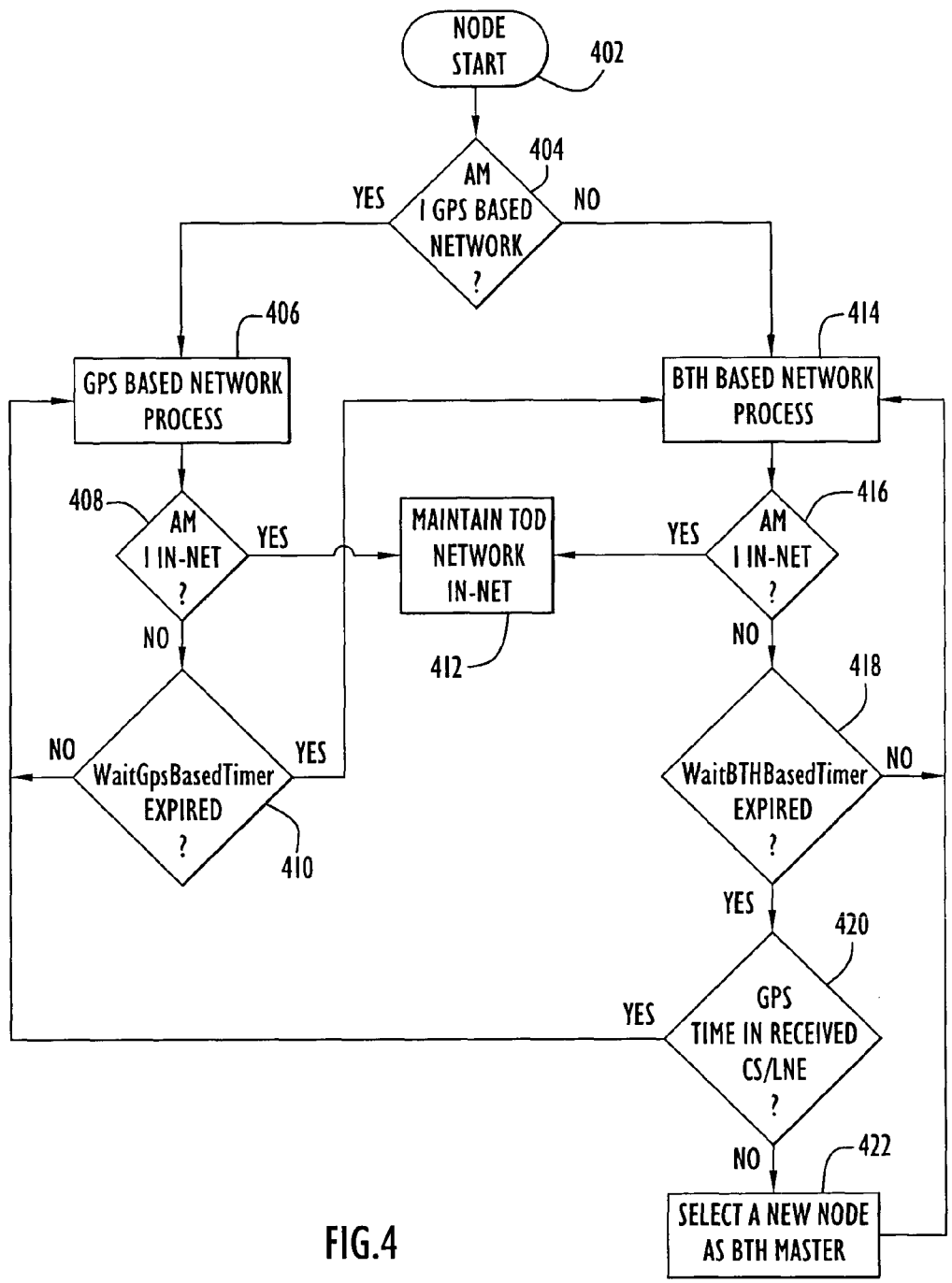
FIG. 4 is a process flow diagram depicting TOD mode switch at initialization within an NTDR node in accordance with an exemplary embodiment of the present invention.

FIG. 4 presents a flow diagram that shows how a representative, non-limiting radio node with a currently deployed (or configured) mode can switch to another mode automatically, if the network can not be formed in a pre-defined time period. As shown in FIG. 4, when a radio node starts, at step 402, the node determines, at step 404, whether the node is configured to join a GPS based TOD network, and if so, the node initiates a GPS based network process, at step 406, as described with respect to FIG. 2A. If the node succeeds, at step 408, to join a GPS network, the node initiates, at step 412, an In-Net TOD maintenance process, as described below with respect to FIGS. 5 and 6. If the node fails, at step 408, to join a GPS TOD based network prior to expiration, at step 410, of a pre-defined time (e.g., WaitGpsBasedTime), the node switches its mode to a BTH based network mode, and the node initiates a BTH based network process, at step 414, as described above with respect to FIG. 2B.

Figure 2B:
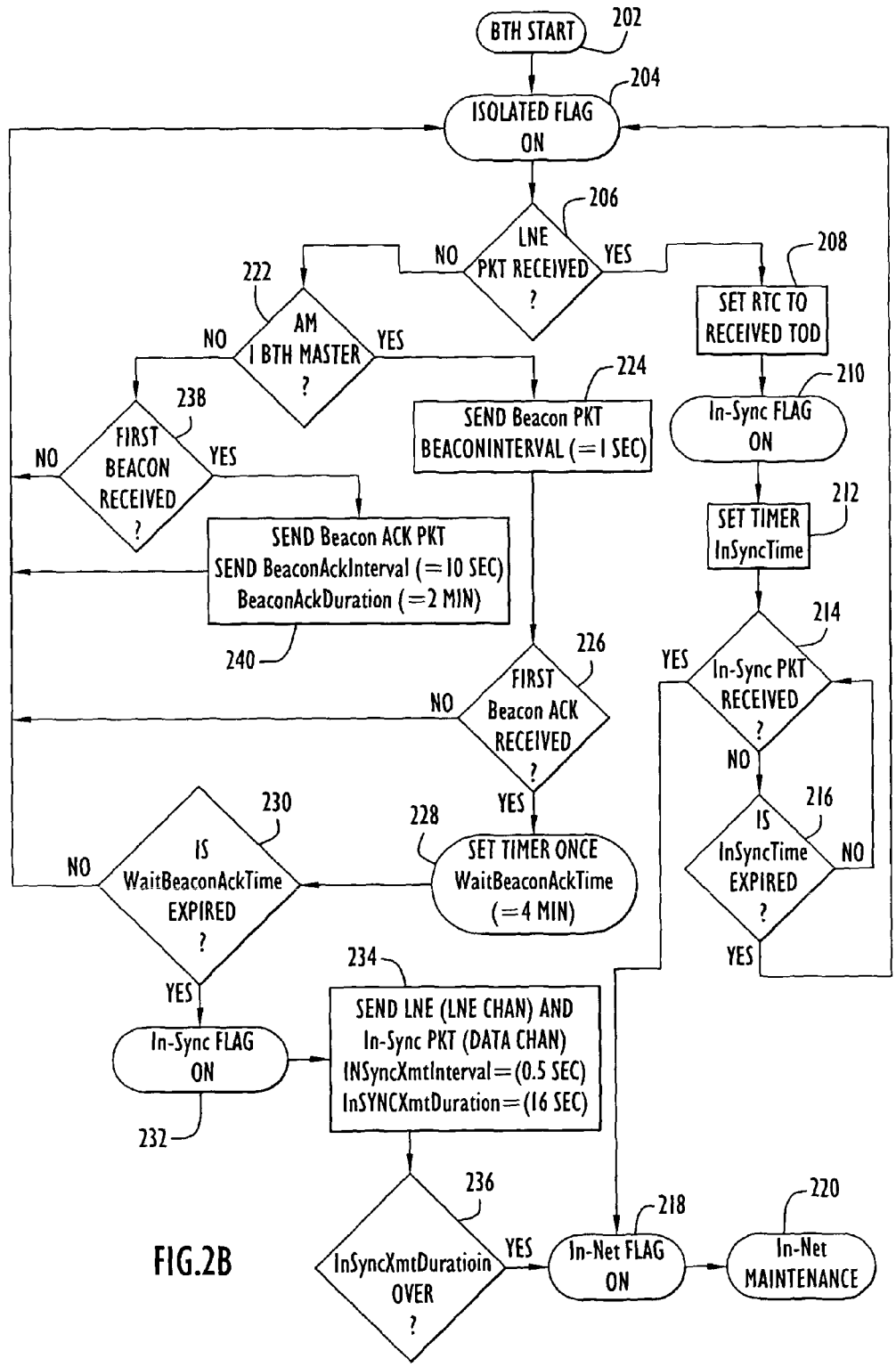
FIG. 2B is a process flow diagram depicting startup of an NTDR node configured to join a network using BTH based TOD synchronization.
Figure 3:
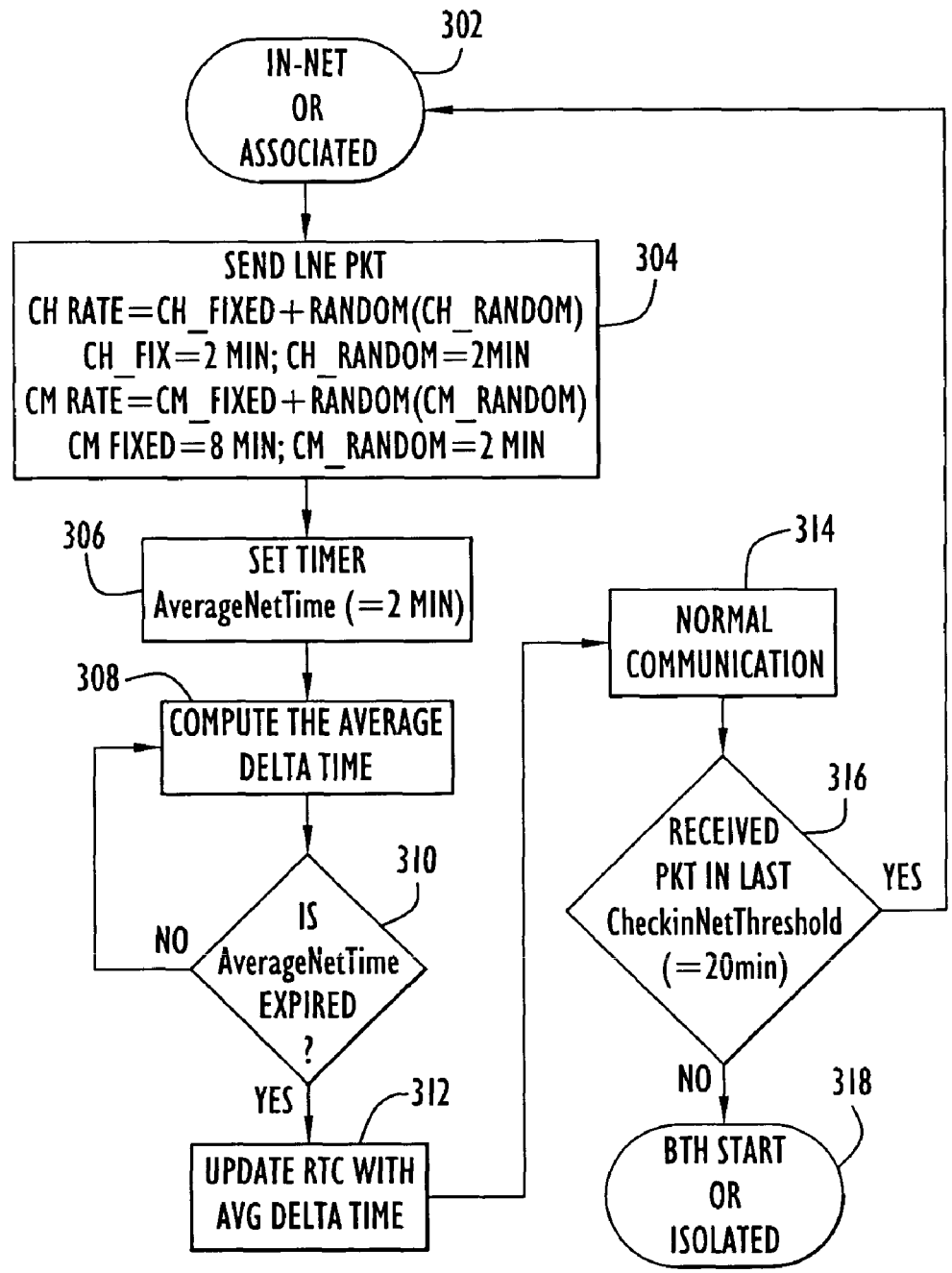
FIG. 3 is a process flow diagram depicting TOD maintenance and In-Net status processing within an NTDR node in a BTH based network.

As further shown in FIG. 4, when a radio node starts, at step 402, and determines, at step 404, that the node is not configured to join a GPS based TOD network, the node initiates a another (e.g., BTH) based TOD network process, at step 414, as described with respect to FIGS. 2B-3, above. If the node succeeds, at step 416, to join a BTH network, the node initiates, at step 412, an In-Net TOD maintenance process, as described below. If the node fails, at step 416, to join a BTH TOD based network prior to expiration, at step 418, of a pre-defined time (e.g., WaitBTHBasedTime), the node determines, at step 420, whether the node has received a CS or LNE message containing a GPS TOD. If the node determines, at step 420, that a CS or LNE message containing a GPS TOD has been received, the node proceeds, at step 406, with a GPS based network process, otherwise, the node selects, at step 422, a new node to serve as BTH master and the BTH based network processing repeats, at step 414, with the new BTH master, as described above.

Figure 5:
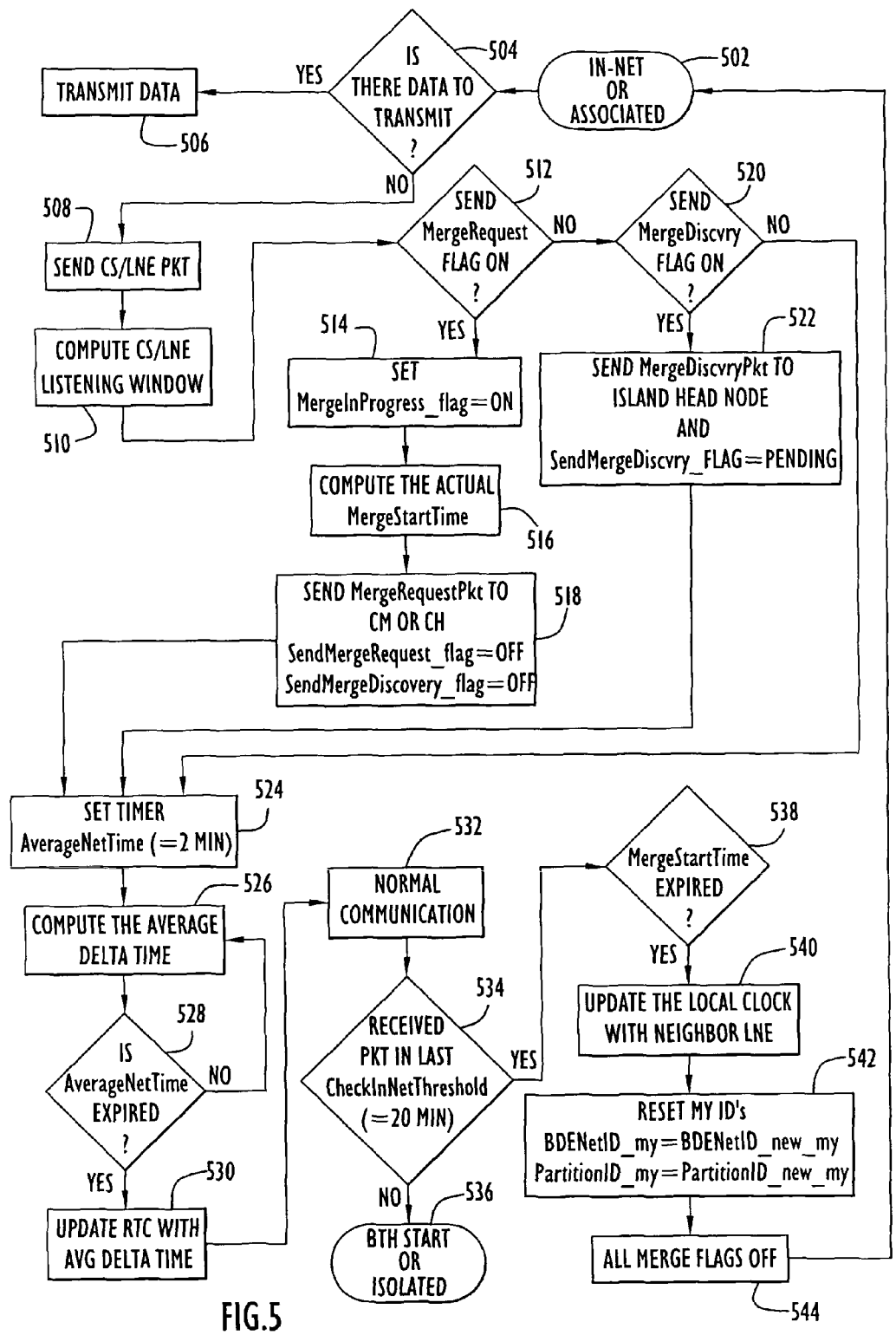
FIG. 5 is a process flow diagram depicting the transmission of merge messages by a radio node in accordance with an exemplary embodiment of the present invention.
Figure 6:
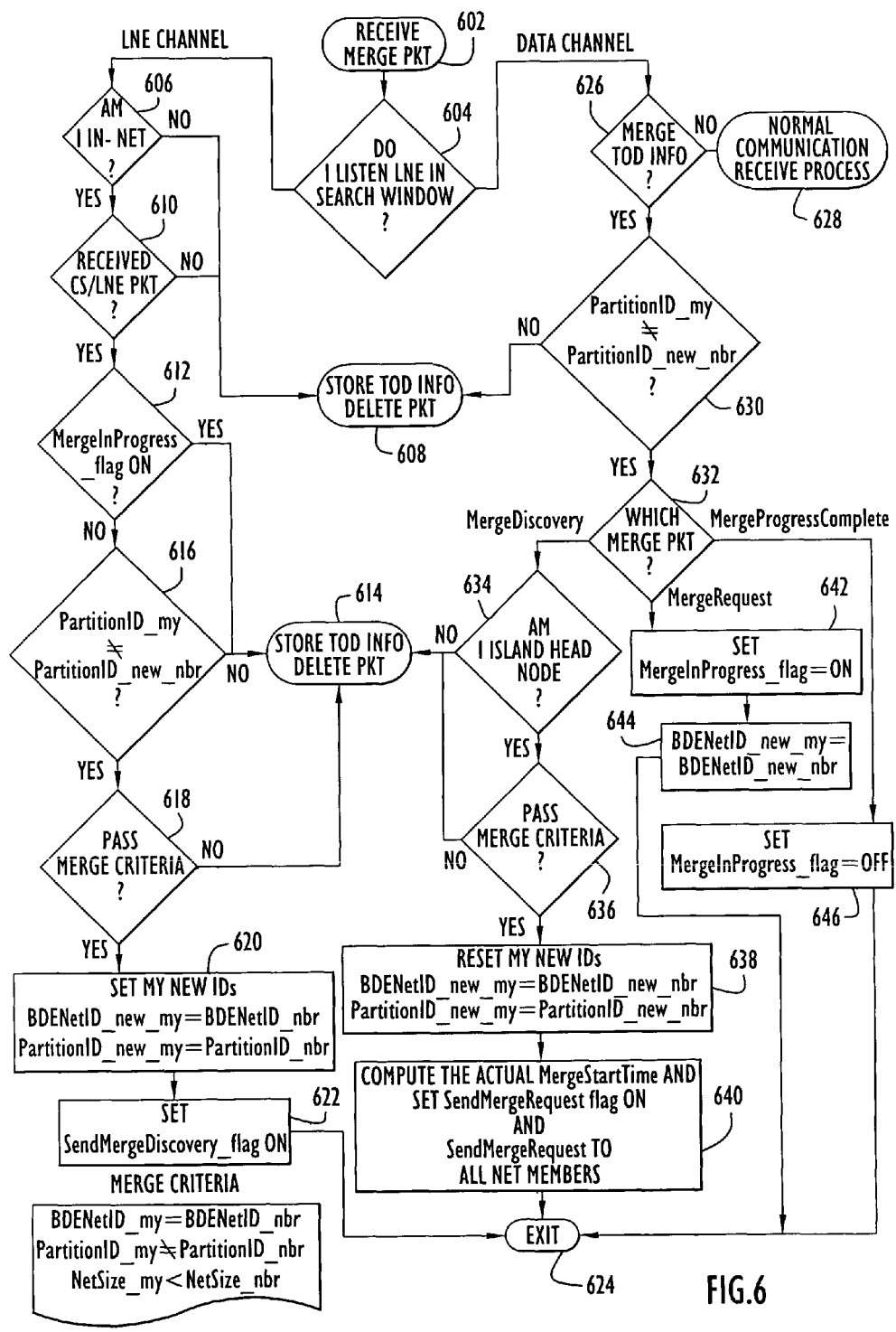
FIG. 6 is a process flow diagram depicting the reception of merge messages by a radio node in accordance with an exemplary embodiment of the present invention.

After a network is formed as described in FIG. 4 above, each member node within the network will have achieved In-Net status within the network. A node with In-Net status is able to send and received messages via the network data channel, as well as monitor the reservation channel. FIGS. 5 and 6 present representative, non-limiting, process flow diagrams of transmit and receive functions that are performed by an In-Net network member node in support of merge processing and in support of overall In-Net status maintenance. FIG. 6 presents a detail process flow that depicts the receipt of CS/LNE messages, merge related messages and associated processing in accordance with the present invention. The status flags set in accordance with the process flow of FIG. 6 are used to control the exemplary BTH network merge related process flow depicted in FIG. 5.

As shown in FIG. 5, upon achieving, at step 502, In-Net status in a network, a radio node determines, at step 504, whether there is any data to transmit. User data has priority over the transmission/receipt of CS/LNE messages, therefore, if there is data to transmit, the data is transmitted, at block 506, and upon transmission of the data, processing resumes at step 502, as described above.

Figure 7:
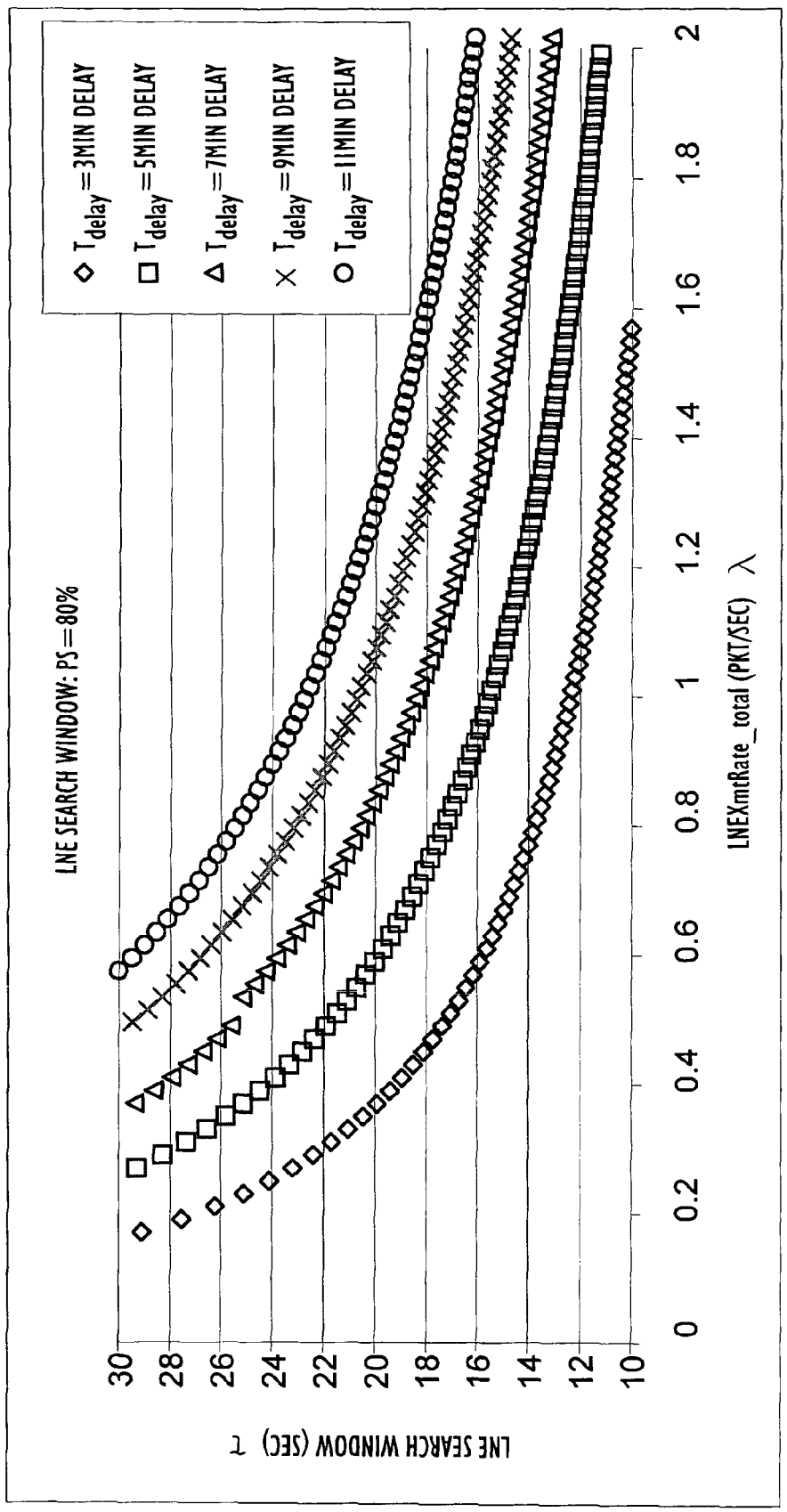
FIG. 7 is a plot of LNE message reception performance as a function of LNE message scan window duration and LNE message transmission rate.

If the radio node determines, at step 504, that there is no data to transmit, the node will proceed with CS/LNE message processing. A value for the CS/LNE transmit delay is computed at step 508 and transmission of CS/LNE messages is performed in accordance with the CS/LNE transmit delay timer, as described above. A value for the CS/LNE scan window and CS/LNE scan window delay interval is computed at step 510 and receipt of CS messages is performed in accordance with the determined CS/LNE scan window and CS/LNE scan window delay interval values, as described above. Further details with respect to the receipt of CS/LNE messages, merge related messages and associated processing, including the setting of merge process control flags based upon the content of CS/LNE and merge messages, are described with respect to FIG. 6, below. Further details with respect to the methods used to determine values for the CS/LNE transmit delay, CS/LNE scan window and CS/LNE scan window delay are described below with respect to FIG. 7 and FIG. 8, below.

If the radio node determines, at step 512, that a SendMergeRequest flag has been set to "On," as a result of CS/LNE message reception during a CS/LNE scan window (as described with respect to FIG. 6, indicating that an island head node has instructed a network merge), the node sets, at step 514, a merge in progress flag (e.g., MergeInProgress_flag) to "On," to indicate that the node is in the process of implementing a merge. At step 516, the radio node computes a time at which all nodes are instructed to simultaneously merge into the new network (e.g., MergeStartTime) and, at step 518, the radio node sets a send merge request flag (e.g., SendMergeRequest_flag) to "Off," sets a send merge discovery flag (e.g., SendMerge Discovery_flag) to "Off," and broadcasts a MergeRequestPkt message to the other cluster member nodes and cluster head nodes within its network to inform the nodes that a merge has been requested by the island head node.

If the radio node determines, at step 520, that a SendMergeDiscovery flag has been set to "On" (as described with respect to FIG. 6, step 622), indicating that a radio node has detected a network that meets an initial merge criteria, the node sets, at step 522, a SendMergeDiscovery_flag to "Pending," to indicate that network data has been forwarded to the island head node and transmits information related to the newly detected network to the network's island head node via a MergeDiscoveryPkt message.

Upon broadcasting, at step 518, a MergeRequestPkt message, transmitting, at step 522, a MergeDiscoveryPkt message, or determining, at step 512, that the SendMergeRequest_flag is set to "Off" and determining, at step 520, that the SendMergeDiscovery_flag is set to "OFF," a radio node proceeds to process TOD messages as described, above with respect to FIG. 3 (at steps 306-318). Specifically, the radio node sets, at step 524 an AverageNetTime (e.g., two minutes) and proceeds to compute, at step 526 the average delta time associated with TODs received from neighboring nodes prior to expiration, at step 528, of the AverageNetTime timer. Upon expiration of the AverageNetTime timer, at step 528, the radio node updates, at step 530, its TOD with the computed average delta time calculated in step 526 and proceeds to conduct normal communications, at step 532, using the updated TOD. If the radio node fails to receive any messages from neighboring nodes prior to expiration, at step 534, of a CheckInNetThresold time (e.g., 20 minutes), the node changes, at step 536, to an Isolated state and tries again to join the existing net in accordance with the BTH process described with respect to FIG. 2B.

If, however, the radio node receives one or more messages from neighboring nodes prior to expiration, at step 534, of the CheckInNetThresold time, and the radio node determines, at step 538, that the MergeStartTime computed at step 516 has expired, the radio node implements the requested merge. The merge is implemented at steps 540-544, by the node setting, at step 540, the radio node's local clock with the TOD of the network with which the radio node is to merge, and setting, at step 542, the BDE network ID and partition ID with the BDE network ID and partition ID of the network with which the radio node is to merge, and setting, at step 544 all merge flags to "Off." Upon completion of the merge process, the process flow returns to step 502, and the radio node proceeds to process data traffic and CS/LNE messages as a node within the new, larger, merged network.

FIG. 6 presents a detail process flow that depicts the receipt of CS/LNE messages, merge related messages and associated processing used to set status flags that control the network merging described with respect to FIG. 5. A radio node alternates between receiving CS/LNE messages, via the reservation channel, as described above during the CS/LNE scan window, and receiving data channel messages, via the data channel, as described above, at times outside of the CS/LNE scan window. The receiver receives In-Net TOD messages from its local network on the data channel. The reservation channel is used to hear CS/LNE advertisements from all networks in range of the receiver.

As shown in FIG. 6, upon receiving, at 602, a radio message while the radio node is scanning, at step 604, for CS/LNE messages during a CS/LNE scan window, the radio node attempts to determine, at step 606, whether the radio's status is In-Net. If the radio node determines that its status is In-Net, the radio node attempts to determine, at step 610, whether the received message is a CS/LNE message. If the radio node determines, at step 606, that its status is not In-Net, or the radio node determines, at step 610, that the received message is not a CS/LNE message, the radio node deletes the received message and terminates CS/LNE scan window message processing at step 608.

If the radio determines, at step 610, that the received message is a CS/LNE message, the radio node determines, at step 612, whether the radio node's MergeInProgress_flag is not set to "On." If the radio node's MergeInProgress_flag is not set to "On," the radio node attempts to determine, at step 616, whether the partition ID of the received message is not the same as the radio node's currently assigned network (i.e., whether the two nodes already belong to the same network partition). If the radio node determines, at step 612, that its MergeInProgress_flag is set to "On," or the radio node determines, at step 616, that the partition ID of the received message is the same as the radio node's currently assigned network partition, the radio node deletes the received message and terminates CS/LNE scan window message processing at step 614.

Upon determining, at step 616, that the two nodes have different partition ID's, the radio node determines, at step 618, whether the CS/LNE message contents comply with a set of pre-defined merge requirements. If so, the radio node initiates a merge by storing, at step 620, the BDE Network ID and the Partition ID contained within the received CS/LNE message within temporary variables BDE_new_my and PartitionID_new_my of the radio node (for use, as described with respect to FIG. 5, step 542, upon expiration of the MergeStart Time), sets, at step 622, the radio node's SendMergeDiscovery_flag to "On," and exits message reception process flow at step 624. However, if the radio node determines, at step 618, that the CS/LNE message contents do not comply with a set of pre-defined merge requirements, the radio node deletes the received message and terminates CS/LNE scan window message processing at step 614.

If, upon receiving, at 602, a radio message the radio node is not scanning, at step 604, for CS/LNE messages within a CS/LNE scan window and the radio node determines, at step 626, that the message does not contain network merge TOD information, the message is processed, at step 628, in accordance as a normal communication message.

If the radio node determines, at step 626, that the message does contain network merge TOD information, and the radio node determines, at step 630, that the Partition ID of the received message is not the same as the Partition ID to which the receiving radio node is currently assigned, the received message is processed, at step 632 based upon the type of merge TOD information contained therein (i.e., MergeDiscovery, MergeRequest, MergeProgressComplete). If the radio node determines, at step 630, that the Partition ID of the received message is the same as the Partition ID to which the receiving radio node is currently assigned, the radio node will store received message TOD related information (for BTH and/or GPS related TOD processing, as described above), delete the received message and terminate the receive message process, at step 608.

If the radio node determines, at step 632, that the received message is a MergeDiscovery message, the radio node determines, at step 634, that the receiving node is an island head node, and the radio node determines, at step 636, the message contents comply with a set of pre-defined merge requirements, the radio node initiates a merge by storing, at step 638, the BDE Network ID and the Partition ID contained within the received merge message within temporary variables BDE_new_my and PartitionID_new_my of the radio node (for use, as described with respect to FIG. 5, step 542, upon expiration of the MergeStart Time). At step 640, the radio node computes a Merge StartTime, sets a SendMergeRequest_flag to "On," sends a MergeRequest merge message to all network members and exits the message reception process flow at step 624.

If the radio node determines, at step 632, that the received message is a MergeRequest message, the radio node sets, at step 642, a MergeInProgress_flag to "On," sets, at step 644, the BDE Network ID and the Partition ID contained within the received merge message within temporary variables BDE_new_my and PartitionID_new_my of the radio node (for use, as described with respect to FIG. 5, step 542, upon expiration of the MergeStart Time) and exits message reception process flow at step 624.

If the radio node determines, at step 632, that the received message is a MergeProgressComplete message, the radio node sets, at step 646, a MergeInProgress_flag to "Off" and exits message reception process flow at step 624.

The initial merge criteria used at step 618 and step 636 can include any number of criteria. In one embodiment, the detected network passes the initial criteria if the BDE network identifier of the detected network is equal to the BDE network identifier of the detecting node, the partition identifier of the detected network is not equal to the partition identifier of the detecting node, and the size of the detected network is greater than the size of the detecting node.

As described above, the CS/LNE transmit rate of a cluster head radio node is faster than that of a cluster member radio node. Nevertheless, it can be assumed that the aggregate LNE message transmit rate by all nodes in a TOD network has a total LNE message transmit rate of λ messages per second. It can be further assumed that the LNE messages are generated in a random pattern in a network and each message arrives at a radio node randomly during the CS/LNE scan window (τ). The probability of at least one LNE received (defined $P_s$) in a given CS/LNE scan window (τ) is expressed by $$P_s = 1 - e^{-\lambda' \tau} \quad (1)$$

where λ' is the actual LNE random arrival rate at a receiving radio node.

The randomly transmitted LNE message of total rate (λ) is only received if the receiver is scanning for LNE messages during a CS/LNE scan window (τ) (or CS/LNE search interval). As described above, a radio node alternates between receiving CS/LNE messages during the CS/LNE scan window and receiving data channel messages (including In-Sync TOD messages) at times outside of the CS/LNE scan window (i.e., during the CS/LNE scan window delay interval).

The CS/LNE scan window delay interval ($T_{delay}$) (or CS/LNE scan window delay interval) is randomized by $$T_{delay} = t_{fix} + \text{random}(t_{ran}) \quad (2)$$

where $t_{fix}$ is the fixed term and $t_{ran}$ is the random part.

Thus, the actual LNE arrival rate (λ') during CS/LNE scan window (τ) in equation (1) can be re-written as:

$$\lambda' = \lambda * (\tau/(T_{delay} + \tau)) \quad (3)$$

To maximize the probability $P_s$, the following condition must be achieved for the TOD merge algorithm:

$$\text{Maximize}\{\lambda * \tau^2 / (T_{delay} + \tau)\} \xrightarrow{T_{delay} \gg \tau} \quad (4)$$

$$\text{Maximize}\{\lambda * \tau^2 / T_{delay}\}$$

Thus, the larger the values of τ and λ selected, the better probability of $P_s$ at the expense of loss (or drop) of normal data, as expected. Notice that the change of τ has quadratic impact in equation (4). Also, faster channel access for LNE search (i.e., a smaller $T_{delay}$) increases TOD merge performance at the expense of normal communication. Thus, the maximum result in equation (4) depends on three independent variables: the CS/LNE transmit rate (λ); CS/LNE scan window (τ); and, CS/LNE scan window delay interval ($T_{delay}$). Given the probability ($P_s$=80%) and various values of $T_{delay}$, the CS/LNE scan window (τ) versus total CS/LNE transmit rate (λ) are plotted in FIG. 7.

The present invention computes CS/LNE transmit rate ($\lambda$), duration of the CS/LNE scan window ($\tau$) and the CS/LNE scan window delay interval ($T_{delay}$) based upon selected network performance parameters in order to achieve reliable LNE reception at the respective radio nodes in support of timely and reliable network merges. The representative, non-limiting formulas proposed, below, have been selected to compute values of $\lambda$, $\tau$, and $T_{delay}$ such that effective and efficient support of network merging is achieved, while minimizing the effect of merge searching and merge execution upon network data communications.

As described above, an island head (IH) node has information such as network sizes and traffic densities in the respective TOD networks (BTH and/or GPS based), and for this reason, the island head node determines when, and with which external network, a network controlled by the island head node is allowed to merge. One, representative, non-limiting factor used by the island head node of the present invention to determine when and with which external network, a network controlled by the island head node is allowed to merge, is network size.

Percentage of network size, in the calculations described below, is based upon the number of active nodes in the network and preferably does not include nodes that may operate as spares in standby mode. An island head node has information regarding the total number of nodes (i.e., $N_{total}$) within its network (i.e., under its control). Percentage of network size ($\rho$) is defined by $$\rho = N_{active}/N_{total} \quad (5)$$

where $N_{active}$=active number of nodes in a TOD network (or controlled by the island head node); and $N_{total}$=total number of nodes in a TOD network (or controlled by the island head node).

As described above, in support of merging decisions, cluster heads of the respective isolated clusters/networks exchange network size and merge priority information that is used by the respective cluster heads to determine which, if any, cluster head is to initiate (i.e., control) the merge process.

In accordance with one embodiment of the present invention, merge priority is determined based upon the percentage of network size ($\rho$) associated with a detected network. An island head node determines the percentage of network size ($\rho$) of a newly detected network and determines a merge priority (typically represented as a binary bit value) for the newly detected network and previously detected networks based upon the respective values of $\rho$ determined for each network. An island head node distributes merge priority information to each network by adding the merge priority information to the link layer headers of messages sent to network member nodes which is subsequently relayed via CS/LNE messages to node members of the detected network. Table 1 presents representative binary merge priority values (e.g. binary 0000 through binary 1010) for detected networks based upon the percentage of network size ($\rho$) associated with the network.

In another embodiment of the present invention, island heads determine percentage of network size ($\rho$) values and add the percentage of network size ($\rho$) information to the link layer headers of messages sent to network member nodes. Once the percentage of network size ($\rho$) value is received, optimum values of $\lambda$, $\tau$, and $T_{delay}$ are computed dynamically by local nets (e.g., by cluster heads and/or cluster members), as described below.

TABLE 1

Merge Priorities for Representative Percentage of Network Size ($\rho$) Values

| Percentage of Network Sizes | Bit Pattern |
|---|---|
| 0.0 | 0000 |
| 0.0 < $\rho$ <= 0.1 | 0001 |
| 0.1 < $\rho$ <= 0.2 | 0010 |
| 0.2 < $\rho$ <= 0.3 | 0011 |
| 0.3 < $\rho$ <= 0.4 | 0100 |
| 0.4 < $\rho$ <= 0.5 | 0101 |
| 0.5 < $\rho$ <= 0.6 | 0110 |
| 0.6 < $\rho$ <= 0.7 | 0111 |
| 0.7 < $\rho$ <= 0.8 | 1000 |
| 0.8 < $\rho$ <= 0.9 | 1001 |
| 0.9 < $\rho$ <= 1 | 1010 |

Figure 8:
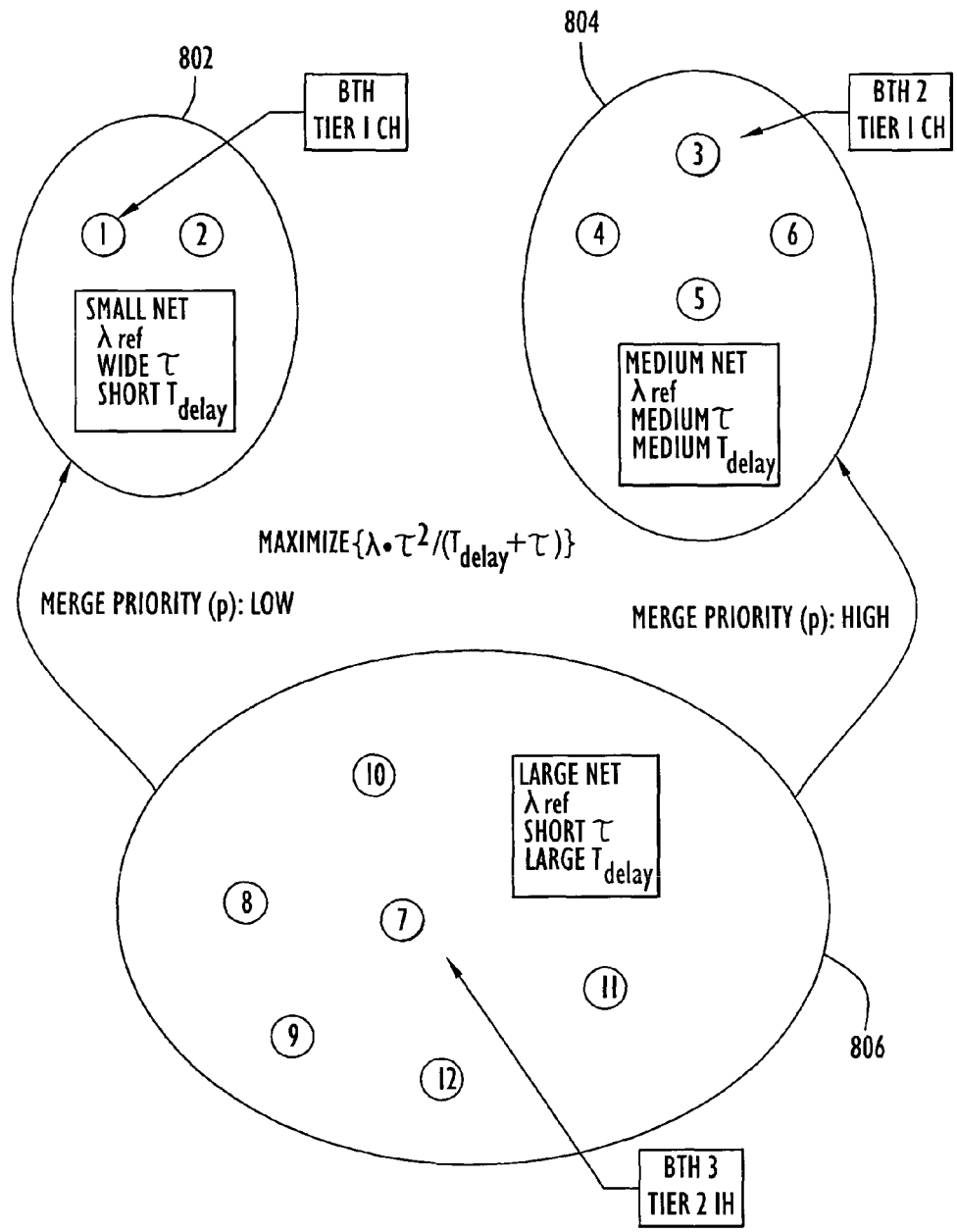
FIG. 8 is a diagram depicting Merge TOD parameters associated with large, medium and small networks in accordance with an exemplary embodiment of the present invention.

FIG. 8 presents the TOD merge priority transmitted by the island head (IH) node to TOD network(s) under its control. BTH 1 network 802 (a small network) may merge to BTH 2 network 804 (a medium network) first if network 802 receives LNE message from network 804 first, rather than from BTH 3 network 806 (a large network). To prevent the unnecessary multiple merges, the island head node decides which networks are allowed to merge. Once a network has successfully merged, this new (and larger) network can not merge again until a pre-defined merge pacing delay has expired. The pacing delay gives other networks a fair opportunity to merge. As shown in equation (4), three variables ($\lambda$, $\tau$, and $T_{delay}$) are independent of each other in order to achieve optimum results. Selection of an optimum value of $\tau$, however, has a greater impact (quadratic) than selection of an optimum value for $\lambda$. The CS/LNE scan window delay interval ($T_{delay}$) is, typically, much longer than the duration of $\tau$ and is dependent upon network performance, as described below.

As described above, a radio node transmits LNE signals at a relatively low rate, however, since all nodes of large networks issue LNE messages independently, a radio node within an isolated, or smaller, network may quickly detect a LNE signal from a node within a large network, despite the fact that individual nodes within the network from which the LNE signal is received are issuing these messages at the relatively low rate. As described above, the CS/LNE transmit rate ($\lambda$) depends on the cluster status of the radio node within its respective network. For a radio node that is a cluster head (CH) or cluster member (CM), a representative CS/LNE transmit rate ($\lambda$) is defined by the pre-defined rate (named $\lambda_{ref}$). The predefined rate $\lambda_{ref}$ is preferably that of $\lambda_{CH}$ or $\lambda_{CM}$ as defined in equation (6) below, depending upon whether the radio node is a cluster head (CH) or cluster member (CM) respectively:

$$\lambda_{CH} = CH_{fix} + \text{random}(CH_{ran});$$

$$\lambda_{CM} = CM_{fix} + \text{random}(CM_{ran}) \quad (6)$$

where
$CH_{fix}$=pre-defined fixed part of cluster head transmit rate (=2 min)
$CH_{ran}$=pre-defined random part of cluster head transmit rate (=2 min)
$CM_{fix}$=pre-defined fixed part of cluster member transmit rate (=8 min)
$CM_{ran}$=pre-defined random part of cluster member transmit rate (=2 min)

When the percentage of network size ($\rho$) is small, a larger CS/LNE scan window ($\tau$) is desirable in order to increase the probability that the smaller network will merge with a larger network, as described above with respect to equation (4). Therefore, determination of λ and τ preferably includes consideration of the percentage of network size (ρ). Representative examples of such equations are presented as equation (7).

$$\lambda \propto f(\rho * \lambda_{ref})$$

$$\tau \propto f(\tau_{ref}/\rho) \qquad (7)$$

where $\lambda_{ref}$=pre-defined reference value of λ
$T_{ref}$=pre-defined reference value of interval τ

Table 2 presents representative LNE transmit rates (λ) and the CS/LNE scan windows (τ) for representative values of network size (ρ). In one embodiment, despite the values of λ and τ determined for the radio node, if the radio node is ready to transmit data, LNE messages are deleted so that the transmission of normal communication data has priority over the transmission of LNE messages. Further, in another embodiment, the CS/LNE transmit rate (λ) and the CS/LNE scan window (τ) are clipped when the network size (ρ) is greater than a pre-defined value ($\rho_{max}$), so that the values for λ and τ are not greater that a predetermined value (e.g., $\lambda_{ref}$ and $\tau_{ref}$) for each, respectively.

TABLE 2

Values for λ and τ for Representative
Percentage of Network Size (ρ) Values

| Percentage of Network Sizes | rate λ | interval τ |
|---|---|---|
| 0.0 | 0 | 0 |
| 0.0 < ρ <= 0.1 | 0.1 * $\lambda_{ref}$ | $\tau_{ref}$/0.1 |
| 0.1 < ρ <= 0.2 | 0.2 * $\lambda_{ref}$ | $\tau_{ref}$/0.2 |
| 0.2 < ρ <= 0.3 | 0.3 * $\lambda_{ref}$ | $\tau_{ref}$/0.3 |
| 0.3 < ρ <= 0.4 | 0.4 * $\lambda_{ref}$ | $\tau_{ref}$/0.4 |
| 0.4 < ρ <= 0.5 | 0.5 * $\lambda_{ref}$ | $\tau_{ref}$/0.5 |
| 0.5 < ρ <= 0.6 | 0.6 * $\lambda_{ref}$ | $\tau_{ref}$/0.6 |
| 0.6 < ρ <= 0.7 | 0.7 * $\lambda_{ref}$ | $\tau_{ref}$/0.7 |
| 0.7 < ρ <= 0.8 | 0.8 * $\lambda_{ref}$ | $\tau_{ref}$/0.8 |
| 0.8 < ρ <= 0.9 | 0.9 * $\lambda_{ref}$ | $\tau_{ref}$/0.9 |
| 0.9 < ρ <= 1.0 | $\lambda_{ref}$ | $\tau_{ref}$ |

In one representative, non-limiting embodiment for the present invention, a value for CS/LNE scan window delay interval ($T_{delay}$) is determined in a manner that includes consideration of the following network characteristics:

If traffic intensity is decreased, a node can allocate more time to searching for LNE messages and vice-versa;

Some radio node may be silent and, therefore, only active nodes ($N_{active}$) are counted by network size;

The larger the network size, the longer a value for $T_{delay}$ should be to provide adequate time for normal data communication;

Upon merging with another network, the merged network should wait a pre-defined period of time before trying to merge with another network, in order to allow all cluster members to complete the merge;

Upon reaching a pre-defined maximum size, $\rho_{max}$, a network should stop attempting to merge, and therefore, stop scanning for LNE messages, by setting $T_{delay}$ infinite.

Considering the above factors, one embodiment of the present invention uses an CS/LNE scan window delay interval ($T_{delay}$) calculation that differs from the CS/LNE scan window delay interval described with respect to equation (2). The modified CS/LNE scan window delay interval ensures that each node has an equal chance of accessing the channel to search for LNE messages. As described above, upon expiration of an CS/LNE scan window delay interval ($T_{delay}$), a radio node starts to listen via the reservation channel for LNE messages for a duration of τ seconds. In the modified embodiment, the CS/LNE scan window delay interval ($T_{delay}$) is recalculated for the next reservation channel access based upon monitored network parameters, as described below with respect to equation (8):

$$T_{delay} = T_{priority} + T_{fix} + \text{random}(T_{ran})$$

$$T_{ran} = \kappa * (N_{active}/N_{max}) * F_{load}$$

$$T_{min} < T_{ran} < T_{max} \qquad (8)$$

where $T_{priority}$=time delay computed by priority level of network from the IH, as listed in Table 3.

$T_{fix}$=pre-defined fixed part of LSD computation to wait for merge pacing delay.

$T_{ran}$=random part of LSD computation.

κ=scale factor to control the random part.

$T_{min}$=pre-defined minimum value to bound $T_{ran}$.

$T_{max}$=pre-defined minimum value to bound $T_{ran}$.

For tactical internet division below (TIDB) channel access, a net access delay (NAD) formula is employed efficiently to access a channel. Computation of load factor, $F_{load}$, is modified so that NTDR network characteristic are used for TOD merge conditions. The load factor, $F_{load}$, can be computed by:

$$F_{load} = S_{offset} + \text{Integer}\left\{ S_{width} * \left[ \delta_i \bigg/ \sqrt{\sum_{j=1}^{N_{active}} \delta_j^2} \right] \right\} \qquad (9)$$

$$S_{offset} = \text{Integer}\{\rho * \text{Max}_{factor}\}$$

$$S_{width} = \text{Max}_{factor} - S_{offset}$$

where $\delta_i$=duty cycle of "not busy" channel at node i; and, $\text{Max}_{factor}$=pre-defined value of maximum value of load factor $F_{load}$.

Nodes operating in a NTDR channel access protocol attempt to maintain an accurate record of the usage of the data channel. Each node tracks the period of time that each data channel is in use along with the identity of the nodes using the channel. The Holdoff Delay (η) is the time that the channel is busy with data transmission. This Holdoff Delay (η), along with other information, are stored in a net allocation vector (NAV). The duty cycle ($\delta_i$) is computed with the Holdoff Delay ($\eta_i$) at i-th node.

$$\delta_i = 1 - \frac{1}{T} \int_t^{t+T} \eta_i \times dt \qquad (10)$$

where T is the average time interval for computing the duty cycle.

The additional time delay, $T_{priority}$, can be computed by multiplying the percentage of network size (ρ) by the pre-defined reference time ($T_{priority\_ref}$), as shown in Table 3.

TABLE 3

Representative Values for Time Delay of $T_{priority}$

| Percentage of Network Sizes | $T_{priority}$ |
|---|---|
| 0.0 | 0 |
| $0.0 < \rho <= 0.1$ | $0.1 * T_{priority\_ref}$ |
| $0.1 < \rho <= 0.2$ | $0.2 * T_{priority\_ref}$ |
| $0.2 < \rho <= 0.3$ | $0.3 * T_{priority\_ref}$ |
| $0.3 < \rho <= 0.4$ | $0.4 * T_{priority\_ref}$ |
| $0.4 < \rho <= 0.5$ | $0.5 * T_{priority\_ref}$ |
| $0.5 < \rho <= 0.6$ | $0.6 * T_{priority\_ref}$ |
| $0.6 < \rho <= 0.7$ | $0.7 * T_{priority\_ref}$ |
| $0.7 < \rho <= 0.8$ | $0.8 * T_{priority\_ref}$ |
| $0.8 < \rho <= 0.9$ | $0.9 * T_{priority\_ref}$ |
| $0.9 < \rho <= 1.0$ | $T_{priority\_ref}$ |

In operation, once the CS/LNE scan window delay interval ($T_{delay}$) has expired, the node waits until the channel is not busy, then the receiver switches from receiving data to listening for LNE messages during the CS/LNE scan window ($\tau$). If we assume that the percentage of network size ($\rho$) is greater that 70% ($\rho_{max}$), then $T_{delay}$ becomes infinite so that the network devotes all resources to normal communication (i.e., the network is not allowed to merge any more). Table 4, below, lists representative values for $\lambda$, $\tau$, $T_{priority}$ for a value of $\rho_{max}$ equal to 70%.

TABLE 4

Representative values for $\lambda$, $\tau$ and T with $\rho_{max}$ = 70%

| Percentage of Network Sizes | rate $\lambda$ | interval $\tau$ | $T_{priority}$ |
|---|---|---|---|
| 0.0 | 0 | 0 | ∞ |
| $0.0 < \rho <= 0.1$ | $0.1 * \lambda_{ref}$ | $\tau_{ref}/0.1$ | $0.1 * T_{priority\_ref}$ |
| $0.1 < \rho <= 0.2$ | $0.2 * \lambda_{ref}$ | $\tau_{ref}/0.2$ | $0.2 * T_{priority\_ref}$ |
| $0.2 < \rho <= 0.3$ | $0.3 * \lambda_{ref}$ | $\tau_{ref}/0.3$ | $0.3 * T_{priority\_ref}$ |
| $0.3 < \rho <= 0.4$ | $0.4 * \lambda_{ref}$ | $\tau_{ref}/0.4$ | $0.4 * T_{priority\_ref}$ |
| $0.4 < \rho <= 0.5$ | $0.5 * \lambda_{ref}$ | $\tau_{ref}/0.5$ | $0.5 * T_{priority\_ref}$ |
| $0.5 < \rho <= 0.6$ | $0.6 * \lambda_{ref}$ | $\tau_{ref}/0.6$ | $0.6 * T_{priority\_ref}$ |
| $0.6 < \rho <= 0.7$ | $0.7 * \lambda_{ref}$ | $\tau_{ref}/0.7$ | $0.7 * T_{priority\_ref}$ |
| $\rho > 0.7$ | $\lambda_{ref}$ | $\tau_{ref}$ | $T_{priority\_ref}$ |

While the primary application of the present invention described in this disclosure is tactical (ground-based) ad-hoc wireless networks, the present invention is equally applicable to ad-hoc wireless networks in general. That is, wireless networks involving airborne, ship-based, as well as mixed ground-based/airborne/ship-based network configurations. Furthermore, the present invention applies to commercial ad-hoc WLAN networks, which are generally more stable than the tactical networks.

For example, the infrastructure-based WPAN (Wireless Personal Area Networks) and WLAN (Wireless Local Area Networks), such as IEEE 802.11, provide a master/slave clock synchronization mechanism. A special fixed node, the access point (AP), is used as the master. In independent networks (i.e., non-infrastructure-based networks), a mobile node transmits a beacon message at a selected beacon period. The present invention can be applied to both infrastructure-based and non-infrastructure-based networks by altering the respective nodes to synchronize, or merge, their respective TOD clocks with a TOD value contained within messages received from the access point (in infrastructure-based networks), or by altering the nodes in a non-infrastructure-based network to synchronize, or merge, their respective TOD clocks with a TOD value contained within messages received from other nodes based upon a common selection criteria (e.g., such as selecting the TOD from the node with the lowest node identifier, selecting a TOD from a node with access to a GPS signal, or merging to a received TOD if the TOD is greater than its own).

It may be appreciated that the embodiments described above and illustrated in the drawings represent only a few of the many ways of implementing and applying an automatic switch of time-of-day (TOD) synchronization and merge protocol. The present invention is not limited to the specific applications/protocols disclosed herein, but may be used to support protocol switches and/or network merging within a wide variety of networks based upon any number of protocols.

The TOD synchronization and merge process described here can be implemented in any number of modules and is not limited to any specific software module architecture. Each module can be implemented in any number of ways and are not limited in implementation to execute process flows precisely as described above. The TOD synchronization and merge processes described above and illustrated in the flow charts and diagrams may be modified in any manner that accomplishes the functions described herein. For example, techniques used to determine LNE transmittal rate ($\lambda$), CS/LNE scan window ($\tau$), CS/LNE scan window delay interval ($T_{delay}$) can be modified in various manners. It is to be understood that various functions of the TOD synchronization and merge process may be distributed in any manner among any quantity (e.g., one or more) of hardware and/or software modules or units, computer or processing systems or circuitry.

The TOD synchronization and merge process can be implemented by any quantity of devices and/or any quantity of personal or other type of computer or processing systems (e.g., cellular telephone, computer network card, laptop computer, palm pilot, blackberry, etc.). The synchronization and merge process may be included within any commercially available operating system that includes communication capabilities (e.g., Windows, OS/2, Unix, Linux, DOS, etc.), any commercially available and/or custom software (e.g., communications software, etc.) and any types of network communication devices (e.g., network cards, radio communication transceivers, gateway computers/routers, etc.).

It is to be understood that the software of the TOD synchronization and merge process may be implemented in any desired computer language, and could be developed by one of ordinary skill in the computer and/or programming arts based on the functional description contained herein and the flow charts illustrated in the drawings. For example, in one embodiment the TOD synchronization and merge process can be written using an assembly level or higher level programming language, however, the present invention is not limited to being implemented in any specific programming language. The various communication network performance parameters and determined TOD synchronization and merge process values may be stored in any quantity or types of file, data or database structures. Moreover, the TOD synchronization and merge process software may be available or distributed via any suitable medium (e.g., stored on devices such as CD-ROM and diskette, downloaded from the Internet or other network (e.g., via packets and/or carrier signals), downloaded from a bulletin board (e.g., via carrier signals), or other conventional distribution mechanisms).

The TOD synchronization and merge process software may be installed and executed on a computer system, network card, radio node, or other device, in any conventional or other manner (e.g., an install program, copying files, received via an existing network connection, etc.). The functions associated with a system that uses the TOD synchronization and merge process (e.g., monitoring network channel usage, transmitting LNE messages, scanning for LNE messages, determining an CS/LNE transmit rate ($\lambda$), determining a CS/LNE scan window ($\tau$), determining a CS/LNE scan window delay interval ($T_{delay}$), etc.) may be performed on any quantity of processors within an executing system or device.

The TOD synchronization and merge process may accommodate any quantity and any type of data set files and/or databases or other structures containing stored network parameters and/or determined values in any desired format (e.g., ASCII, plain text, any word processor or other application format, etc.).

Further, any references herein to software performing various functions generally refer to processors performing those functions under software control. Such processors may alternatively be implemented by hardware or other processing circuitry. The various functions of the TOD synchronization and merge process may be distributed in any manner among any quantity (e.g., one or more) of hardware and/or software modules or units. Processing systems or circuitry, may be disposed locally or remotely of each other and communicate via any suitable communications medium (e.g., hardwire, wireless, etc.). The software and/or processes described above and illustrated in the flow charts and diagrams may be modified in any manner that accomplishes the functions described herein.

From the foregoing description it may be appreciated that the present invention includes a TOD synchronization and merge process that is capable of efficiently and effectively merging networks despite significant differences in TOD epochs and despite the use of different TOD protocols in the respective networks to be merged.

Having described preferred embodiments of a TOD synchronization and merge process, it is believed that other modifications, variations and changes may be suggested to those skilled in the art in view of the teachings set forth herein. It is therefore to be understood that all such variations, modifications and changes are believed to fall within the scope of the present invention as defined by the appended claims.

What is claimed is:

1. A communication unit that transmits messages to and receives messages from neighboring communication units, the communication unit comprising:
   a transmitter to transmit an outgoing message to a neighboring communication unit;
   a receiver to receive an incoming message from a neighboring communication unit;
   a storage unit to store communication unit connectivity information, neighboring communication unit connectivity information and merge request information; and
   a processor to control said transmission of outgoing messages and reception of incoming messages, wherein said processor includes:
      a synchronization module to join the communication unit to an existing communication network at power up from among a plurality of existing communication networks each with a different Time Of Day synchronization mode, and to start an isolated network with neighboring communication units in response to failure to join the communication unit to at least one of the existing communication networks;
      a merge module to examine said stored communication unit connectivity information, stored neighboring communication unit connectivity information and stored merge request information to determine merge control parameters to control merger between the network containing the communication unit and operating in a first Time Of Day synchronization mode and a neighboring communication network operating in a second Time Of Day synchronization mode that is different from the first mode, wherein the network containing the communication unit includes a plurality of communication units and said neighboring communication network includes a plurality of communication nodes; and
      a controller module to control merging of the communication unit with said neighboring communication network in accordance with said merge control parameters determined by said merge module to merge the network containing the communication unit with the neighboring communication network.

2. The communication unit of claim 1 wherein said transmitter transmits said outgoing message in the form of radio signals.

3. The communication unit of claim 1 wherein said receiver receives said incoming message in the form of radio signals.

4. The communication unit of claim 1 wherein said synchronization module includes:
   a time synchronization module to determine the Time Of Day synchronization mode used by the communication unit.

5. The communication unit of claim 4 wherein the synchronization module further includes:
   a startup module to join the communication unit to an existing communication network at power up using a user configurable primary Time Of Day synchronization mode.

6. The communication unit of claim 5 wherein the synchronization module further includes:
   a Time Of Day mode module to change the Time Of Day synchronization mode of the communication unit in response to the communication unit failing to join a communication network with neighboring communication units using a previously selected Time Of Day synchronization mode and to join the communication unit to an existing communication network using the changed Time Of Day synchronization mode.

7. The communication unit of claim 1 wherein said storage unit further includes:
   a connectivity module to store at least one of an identifier for a communication network to which the communication unit belongs, an identifier for a neighboring communication unit, an identifier for a communication network to which a neighboring communication unit belongs, and an identifier for a neighboring communication unit's neighbor.

8. The communication unit of claim 1 wherein said processor further includes:
   a search module to determine search parameters that control the manner in which the communication unit searches for neighboring communication units and neighboring communication network nodes;
   wherein the controller module further controls transmission of outgoing messages and reception of incoming messages in a manner consistent with search parameters determined by the search module.

9. The communication unit of claim 8 wherein said search module further includes:
   a transmit rate module to determine a rate at which the communication unit transmits outgoing messages containing network connectivity information.

10. The communication unit of claim 9 wherein the transmit rate module determines the transmit rate based upon a user configurable reference transmit rate value and a percentage of network size parameter value for the communication network to which the communication unit belongs.

11. The communication unit of claim 10 wherein the transmit rate is proportional to the percentage of network size parameter value.

12. The communication unit of claim 8 wherein said search module further includes:
   a scan window module to determine a scan window interval during which the communication unit receives incoming network connectivity messages; and
   a scan window delay module to determine a delay between scan window intervals.

13. In a communication network having a plurality of communication units, a communication unit that transmits messages to and receives messages from neighboring communication units, the communication unit comprising:
   a transmitter to transmit an outgoing message to a neighboring communication unit;
   a receiver to receive an incoming message from a neighboring communication unit;
   a storage unit to store communication unit connectivity information, neighboring communication unit connectivity information and merge request information; and
   a processor to control said transmission of outgoing messages and reception of incoming messages, wherein said processor includes:
      a merge module to examine said stored communication unit connectivity information, stored neighboring communication unit connectivity information and stored merge request information to determine merge control parameters to control merger between the communication unit operating in a first Time Of Day synchronization mode and a neighboring communication network operating in a second Time Of Day synchronization mode that is different from the first mode;
      a controller module to control merging of the communication unit with said neighboring communication network in accordance with said merge control parameters determined by said merge module; and
      a search module to determine search parameters that control the manner in which the communication unit searches for neighboring communication units and neighboring communication network nodes, wherein said search module includes:
         a scan window module to determine a scan window interval during which the communication unit receives incoming network connectivity messages, wherein the scan window module determines the scan window interval based upon a user configurable reference scan window value and a percentage of network size parameter value for the communication network to which the communication unit belongs; and
         a scan window delay module to determine a delay between scan window intervals;
      wherein the controller module further controls transmission of outgoing messages and reception of incoming messages in a manner consistent with search parameters determined by the search module.

14. The communication unit of claim 13 wherein the scan window interval is inversely proportional to the percentage of network size parameter value.

15. The communication unit of claim 1 wherein said merge module further includes:
   a merge priority module to determine a merge priority for each neighboring communication network in response to the communication unit controlling said merging, wherein the merge priority controls the priority in which the communication unit allows the communication network to which the communication unit belongs to merge with neighboring communication networks.

16. The communication unit of claim 15 wherein the merge priority module determines the merge priority for a neighboring communication network based upon a comparison of a number of active communication units in the neighboring communication network with a number of total communication units in the neighboring communication network.

17. The communication unit of claim 16 wherein the merge priority is proportional to a quotient of the number of active communication units and the number of total communication units for each respective neighboring network.

18. A method for establishing communication between a plurality of communication units comprising:
   (a) joining a communication unit to an existing communication network at power up from among a plurality of existing communication networks each with a different Time Of Day synchronization mode, and starting an isolated network with neighboring communication units in response to failure to join the communication unit to at least one of the existing communication networks;
   (b) storing communication unit connectivity information, neighboring communication unit connectivity information and merge request information within the communication unit;
   (c) examining said stored communication unit connectivity information, stored neighboring communication unit connectivity information and stored merge request information to determine merge control parameters to control merger between the network containing the communication unit and operating in a first Time Of Day synchronization mode and a neighboring communication network operating in a second Time Of Day synchronization mode that is different from the first mode, wherein the network containing the communication unit includes a plurality of communication units and said neighboring communication network includes a plurality of communication nodes; and
   (d) controlling merging of the network containing the communication unit with the neighboring communication network in accordance with said merge control parameters.

19. The method of claim 18, wherein communications are in the form of radio signals.

20. The method of claim 18, wherein step (a) further includes:
   (a.1) determining the Time Of Day synchronization mode used by the communication unit.

21. The method of claim 20, wherein step (a.1) further includes:
   (a.1.1) joining the communication unit to an existing communication network using a user configurable primary Time Of Day synchronization mode.

22. The method of claim 21, wherein step (a.1) further includes:
   (a.1.2) changing the Time Of Day synchronization mode of the communication unit in response to the communication unit failing to join a communication network with neighboring communication units using a previously selected Time Of Day synchronization mode; and (a.1.3) joining the communication unit to an existing communication network using the changed Time Of Day synchronization mode.

23. The method of claim 18, wherein step (b) further includes:
(b.1) storing at least one of an identifier for a communication network to which the communication unit belongs, an identifier for a neighboring communication unit, an identifier for a communication network to which a neighboring communication unit belongs, and an identifier for a neighboring communication unit's neighbor.

24. The method of claim 18, wherein step (c) further includes:
(c.1) determining search parameters that control the manner in which the communication unit searches for neighboring communication units and neighboring communication network nodes; and
(c.2) controlling transmission of outgoing messages and reception of incoming messages in a manner consistent with said determined search parameters.

25. The method of claim 24, wherein step (c.1) further includes:
(c.1.1) determining a rate at which the communication unit transmits outgoing messages containing network connectivity information.

26. The method of claim 25, wherein said transmit rate is based upon a user configurable reference transmit rate value and a percentage of network size parameter value for the communication network to which the communication unit belongs.

27. The method of claim 26, wherein the transmit rate is proportional to the percentage of network size parameter value.

28. The method of claim 24, wherein step (c.1) further includes:
(c.1.1) determining a scan window interval during which the communication unit receives incoming network connectivity messages; and
(c.1.2) determining a delay between scan window intervals.

29. In a communication network having a plurality of communication units that transmit messages to and receive messages from neighboring communication units, a method for establishing communication between the plurality of communication units comprising:
(a) storing communication unit connectivity information, neighboring communication unit connectivity information and merge request information within a communication unit;
(b) examining said stored communication unit connectivity information, stored neighboring communication unit connectivity information and stored merge request information to determine merge control parameters to control merger between the communication unit operating in a first Time Of Day synchronization mode and a neighboring communication network operating in a second Time Of Day synchronization mode that is different from the first mode, wherein step (b) further includes:
(b.1) determining search parameters that control the manner in which the communication unit searches for neighboring communication units and neighboring communication network nodes, wherein step (b.1) further includes:
(b.1.1) determining a scan window interval during which the communication unit receives incoming network connectivity messages, wherein the scan window interval is determined based upon a user configurable reference scan window value and a percentage of network size parameter value for the communication network to which the communication unit belongs; and
(b.1.2) determining a delay between scan window intervals; and
(b.2) controlling transmission of outgoing messages and reception of incoming messages in a manner consistent with said determined search parameters; and
(c) controlling merging of the communication unit with a neighboring communication network in accordance with said merge control parameters.

30. The method of claim 29 wherein the scan window interval is inversely proportional to the percentage of network size parameter value.

31. The method of claim 18, wherein step (c) further includes:
(c.1) determining a merge priority for each neighboring communication network in response to the communication unit controlling said merging, wherein the merge priority controls the priority in which the communication unit allows the communication network to which the communication unit belongs to merge with neighboring communication networks.

32. The method of claim 31, wherein the merge priority for a neighboring communication network is based upon a comparison of a number of active communication units in the neighboring communication network with a number of total communication units in the neighboring communication network.

33. The method of claim 32, wherein the merge priority is proportional to a quotient of the number of active communication units and the number of total communication units for each respective neighboring network.

34. A communication network comprising:
a plurality of communication units each having connectivity with a plurality of neighboring communication units that belong to the same communication network operating in a first Time Of Day synchronization mode, wherein each communication unit includes a synchronization module to join that communication unit to an existing communication network at power up from among a plurality of existing communication networks each with a different Time Of Day synchronization mode, and to start an isolated network with neighboring communication units in response to failure to join that communication unit to at least one of the existing communication networks;
wherein one of said communication units is designated a control node that is delegated authority for controlling merges between the communication network to which the control node belongs and operating in the first Time Of Day synchronization mode and a selected neighboring communication network operating in a second Time Of Day synchronization mode that is different from the first mode, wherein the selected neighboring communication network includes a plurality of communication units, and wherein the control node includes:
a connectivity information storage module to store connectivity information related to connectivity between a plurality of communication units within said network and a plurality of neighboring communication units that belong to neighboring communication networks;
a merge module to examine the stored connectivity information and to set merge control parameters that control whether a merge is initiated between the communication network operating in the first Time Of Day synchronization mode to which the control node belongs and the selected neighboring communication network operating in the second Time Of Day synchronization mode; and a controller module to control network merging in a manner consistent with merge parameters determined by the merge module.

35. The network of claim 34 wherein said each communication unit transmits messages in the form of radio signals.

36. The network of claim 34 wherein said merge module further includes:

a merge priority module to determine a merge priority parameter for a neighboring communication network that determines a priority in which the communication network to which the control node belongs allows merges with neighboring communication networks.

37. The network of claim 36 wherein the merge priority module determines the merge priority for a neighboring communication network based upon a comparison of a count of active communication units within a neighboring communication network with a count of all communication units within a neighboring communication network.

38. The network of claim 37 wherein the merge priority is proportional to a quotient of the count of active communication units and the count of all communication units for each respective neighboring network.

* * * * *